United States Patent
Caires et al.

(10) Patent No.: US 10,736,810 B2
(45) Date of Patent: Aug. 11, 2020

(54) CONTROL SYSTEM FOR EXOSKELETON APPARATUS

(71) Applicant: BIONIK LABORATORIES, INC., Toronto (CA)

(72) Inventors: Thiago Caires, Toronto (CA); Michal Prywata, Toronto (CA)

(73) Assignee: Bionik Laboratories, Inc., Toronto (CA)

( * ) Notice: Subject to any disclaimer, the term of this patent is extended or adjusted under 35 U.S.C. 154(b) by 298 days.

(21) Appl. No.: 15/829,647

(22) Filed: Dec. 1, 2017

(65) Prior Publication Data

US 2018/0098906 A1 Apr. 12, 2018

Related U.S. Application Data

(63) Continuation of application No. 13/946,161, filed on Jul. 19, 2013, now abandoned.

(51) Int. Cl.
*A61H 3/00* (2006.01)
*A61H 1/02* (2006.01)
*B25J 9/16* (2006.01)

(52) U.S. Cl.
CPC .............. *A61H 3/00* (2013.01); *A61H 1/024* (2013.01); *A61H 1/0244* (2013.01);
(Continued)

(58) Field of Classification Search
CPC .......... A61H 1/00; A61H 1/02; A61H 1/0214; A61H 1/0237; A61H 1/0274; A61H 2001/0203; A61H 2001/0207; A61H 2001/0211; A61H 3/00; A61H 1/024; A61H 1/0244; A61H 2201/0103; A61H 2201/1463; A61H 2201/165; A61H 2201/1676; A61H 2201/5007; A61H 2201/5061; A61H 2201/5069; A61H 2201/5071; A61H 2201/5084;
(Continued)

(56) References Cited

U.S. PATENT DOCUMENTS 2,724,062 A  11/1955  Nolde
2,724,085 A  11/1955  Charbonneau
(Continued)

FOREIGN PATENT DOCUMENTS

CA   2734469 C   4/2010
CA   2740438 A1  4/2010
(Continued)

OTHER PUBLICATIONS

Examination Report received in connection with counterpart New Zealand Patent Application No. 716613, dated Mar. 1, 2017.
(Continued)

*Primary Examiner* — Steven O Douglas
(74) *Attorney, Agent, or Firm* — Bereskin & Parr LLP/S.E.N.C.R.L., s.r.l.

(57) ABSTRACT

A control system for an exoskeleton for a limb of a user wherein the limb has an upper portion connected to the body of a user and a lower limb portion is provided. The control system controls operation of one or more drive motors that rotate one or more joints of the exoskeleton. Input signals from pressure sensors and positional sensors are monitored and, when the input signals fall within expected values, one or more control actions may be implemented.

20 Claims, 37 Drawing Sheets

(52) U.S. Cl.
CPC ..... *B25J 9/1615* (2013.01); *A61H 2201/0103* (2013.01); *A61H 2201/1463* (2013.01); *A61H 2201/165* (2013.01); *A61H 2201/1676* (2013.01); *A61H 2201/5007* (2013.01); *A61H 2201/5061* (2013.01); *A61H 2201/5069* (2013.01); *A61H 2201/5071* (2013.01); *A61H 2201/5084* (2013.01); *G05B 2219/40305* (2013.01)

(58) Field of Classification Search
CPC ..... A61F 5/0102; A61F 5/0585; B25J 9/1615; G05B 2219/40305
See application file for complete search history.

(56) References Cited

U.S. PATENT DOCUMENTS

| | | |
|---|---|---|
| 2,728,340 A | 12/1955 | Meidenbauer |
| 2,731,612 A | 1/1956 | Heller |
| 3,551,914 A | 1/1971 | Woodall |
| 3,581,740 A | 6/1971 | Sherbourne |
| 3,883,053 A | 5/1975 | Pritchard et al. |
| 4,306,320 A | 12/1981 | Delp |
| 4,364,128 A | 12/1982 | Mummert |
| 4,573,455 A | 3/1986 | Hoy |
| 4,628,945 A | 12/1986 | Johnson |
| 4,697,808 A | 10/1987 | Larson et al. |
| 4,993,409 A | 2/1991 | Grim |
| 5,020,515 A | 6/1991 | Mann et al. |
| 5,030,239 A | 7/1991 | Copes |
| 5,042,799 A | 8/1991 | Stanley |
| 5,139,525 A | 8/1992 | Kristinsson |
| 5,282,460 A | 2/1994 | Boldt |
| 5,385,538 A | 1/1995 | Mann |
| 5,425,780 A | 6/1995 | Flatt et al. |
| 5,462,517 A | 10/1995 | Mann |
| 5,514,081 A | 5/1996 | Mann |
| 5,626,557 A | 5/1997 | Mann |
| 5,662,693 A | 9/1997 | Johnson et al. |
| 5,888,213 A | 3/1999 | Sears et al. |
| 5,961,541 A | 10/1999 | Ferrati |
| 6,045,524 A | 4/2000 | Hayashi et al. |
| 6,361,570 B1 | 3/2002 | Gow |
| 6,379,393 B1 | 4/2002 | Mavroidis et al. |
| 6,669,660 B2 | 12/2003 | Branch |
| 6,863,695 B2 | 3/2005 | Doddroe et al. |
| 7,190,141 B1 | 3/2007 | Ashrafiuon et al. |
| 7,204,814 B2 | 4/2007 | Peles |
| 7,390,309 B2 | 6/2008 | Dariush |
| 7,429,253 B2 | 9/2008 | Shimada et al. |
| 7,448,522 B2 | 11/2008 | Collier et al. |
| 7,479,121 B2 | 1/2009 | Branch |
| 7,549,969 B2 | 6/2009 | van den Bogert |
| 7,731,670 B2 | 6/2010 | Aguirre-Ollinger et al. |
| 7,731,674 B2 | 6/2010 | Ashihara et al. |
| 7,819,926 B1 | 10/2010 | Longino |
| 8,096,965 B2 | 1/2012 | Goffer et al. |
| 8,231,688 B2 | 7/2012 | Fairbanks et al. |
| 2003/0093021 A1 | 5/2003 | Goffer |
| 2003/0115954 A1 | 6/2003 | Zemlyakov et al. |
| 2004/0102723 A1 | 5/2004 | Horst |
| 2005/0102111 A1 | 5/2005 | Dariush et al. |
| 2006/0149338 A1 | 7/2006 | Flaherty et al. |
| 2006/0179577 A1 | 8/2006 | Chaffee |
| 2006/0247904 A1 | 11/2006 | Dariush |
| 2008/0009771 A1 | 1/2008 | Perry et al. |
| 2008/0077057 A1 | 3/2008 | Peles |
| 2008/0097269 A1 | 4/2008 | Weinberg et al. |
| 2008/0249438 A1 | 10/2008 | Agrawal et al. |
| 2009/0292369 A1 | 11/2009 | Kazerooni et al. |
| 2010/0023133 A1 | 1/2010 | Fairbanks et al. |
| 2010/0094182 A1 | 4/2010 | Noda |
| 2010/0094185 A1 | 4/2010 | Amundson et al. |
| 2010/0094188 A1 | 4/2010 | Goffer et al. |
| 2010/0198124 A1 | 8/2010 | Bhugra |
| 2011/0009787 A1 | 1/2011 | Pallari et al. |
| 2011/0066088 A1 | 3/2011 | Little et al. |
| 2011/0082566 A1 | 4/2011 | Herr et al. |
| 2011/0105966 A1 | 5/2011 | Kazerooni et al. |
| 2011/0166489 A1 | 7/2011 | Angold et al. |
| 2011/0257764 A1 | 10/2011 | Herr et al. |
| 2011/0266323 A1 | 11/2011 | Kazerooni et al. |
| 2011/0313331 A1 | 12/2011 | Dehez et al. |
| 2012/0004581 A1 | 1/2012 | Dinon |
| 2012/0071797 A1 | 3/2012 | Aoki et al. |
| 2012/0150086 A1 | 6/2012 | Cohen |
| 2012/0172770 A1 | 7/2012 | Almesfer et al. |
| 2012/0179075 A1 | 7/2012 | Perry et al. |
| 2012/0235417 A1 | 9/2012 | Arntz |
| 2013/0237884 A1 | 9/2013 | Kazerooni et al. |
| 2014/0142475 A1 | 5/2014 | Goldfarb et al. |

FOREIGN PATENT DOCUMENTS

| | | |
|---|---|---|
| CA | 2746327 A1 | 9/2010 |
| CA | 2769975 A1 | 1/2011 |
| CN | 102036638 A | 4/2011 |
| CN | 102065799 A | 5/2011 |
| CN | 102088933 A | 6/2011 |
| CN | 102098986 A | 6/2011 |
| EP | 1842518 A1 | 10/2007 |
| EP | 1260201 B1 | 12/2008 |
| EP | 2326288 A1 | 6/2011 |
| EP | 2331026 A1 | 6/2011 |
| EP | 2346447 A1 | 7/2011 |
| EP | 2349121 A2 | 8/2011 |
| EP | 2373276 A1 | 10/2011 |
| EP | 2448540 A1 | 5/2012 |
| EP | 2231096 B1 | 4/2013 |
| KR | 1020100106527 A | 10/2010 |
| WO | 2006078871 A2 | 7/2006 |
| WO | 2006113520 A2 | 10/2006 |
| WO | 2009081710 A1 | 7/2009 |
| WO | 2009143161 A1 | 11/2009 |
| WO | 2009151630 A1 | 12/2009 |
| WO | 2010005473 A1 | 1/2010 |
| WO | 2010011848 A1 | 1/2010 |
| WO | 2010019300 A1 | 2/2010 |
| WO | 2010025403 A1 | 3/2010 |
| WO | 2010036791 A1 | 4/2010 |
| WO | 2010044087 A2 | 4/2010 |
| WO | 2010101595 A1 | 9/2010 |
| WO | 2011026086 A1 | 3/2011 |
| WO | 2011127410 A2 | 10/2011 |
| WO | 2012027336 A1 | 3/2012 |
| WO | 2012037555 A1 | 3/2012 |
| WO | 2012044621 A1 | 4/2012 |
| WO | 2012048123 A1 | 4/2012 |
| WO | 2012052988 A2 | 4/2012 |
| WO | 2012100250 A1 | 7/2012 |
| WO | 2012125765 A2 | 9/2012 |
| WO | 2012171000 A1 | 12/2012 |
| WO | 2012177125 A1 | 12/2012 |
| WO | 2013019749 A1 | 2/2013 |

OTHER PUBLICATIONS

Examination Report received in connection with counterpart New Zealand patent Application No. 716613, dated Apr. 13, 2017.
Examination Report received in connection with counterpart New Zealand Patent Application No. 716613, dated Apr. 20, 2017.
Notice of Acceptance received in connection with corresponding New Zealand Patent Application No. 716613, dated Apr. 21, 2017.
Extended European Search Report for European Patent Application No. 14826878.2, dated Feb. 7, 2017.
International Search Report and Written Opinion received in connection to PCT Application No. PCT/CA2014/000342 dated Jul. 16, 2014.
English machine translation of the Abstract of WO2009081710A1, published on Jul. 2, 2009.
English machine translation of the Abstract of KR10-2010-0106527, dated Oct. 1, 2010.

(56) References Cited

OTHER PUBLICATIONS

English machine translation of the Abstract of CN102098986A, published on Jun. 15, 2011.
English machine translation of the Abstract of CN102088933A, published on Jun. 8, 2011.
English machine translation of the Abstract of CN102036638A, published on Apr. 27, 2011.

CONTROL SYSTEM FOR EXOSKELETON APPARATUS

CROSS REFERENCE TO RELATED APPLICATION

This application is a continuation of U.S. patent application Ser. No. 13/946,161, which was filed on Jul. 19, 2013, the entire contents of which are incorporated herein by reference.

FIELD

This specification relates to an exoskeleton apparatus. In a preferred embodiment, this specification relates to a control system for an exoskeleton apparatus. Preferably, the control system facilitates control of motorized joints of the exoskeleton apparatus to carry out activities such as walking.

INTRODUCTION

The following is not an admission that anything discussed below is part of the prior art or part of the common general knowledge of a person skilled in the art.

Spinal cord injury is one of the primary causes of paralysis. Spinal cord injuries can be of varying severity, ranging from high C level injuries to Low S level injuries. Spinal cord injuries may result in paraplegia—the loss of movement or feeling in the lower limbs—or even quadriplegia—the loss of movement or feeling in both the lower and upper limbs.

A person with complete or partial paraplegia is typically restricted to a seated or recumbent position. Aside from the obvious health difficulties, such as lack of mobility, there are numerous secondary health issues associated with paraplegia. Some of the most common secondary conditions include pressure ulcers, respiratory problems, genitourinary problems, spasticity, pain, and autonomic dysreflexia.

Because of all these secondary health complications, rehospitalization for paraplegia patients outpaces the general population by up to 2.6 times normal. Also, secondary conditions do not exist in isolation but have the potential to exacerbate each other, which can lead to serious health complications.

However, if paraplegics are provided with the ability to be in an upright position and mobile, for example using an assistive device, many of these complications can be reduced or eliminated.

Moreover, a suitable assistive device can provide ongoing, active rehabilitation, which has the potential to restore motion and feeling in some patients' limbs over time. This is especially so if use of the assistive device is initiated immediately following initial injury.

Currently, rehabilitation is a manual and laborious process. A patient typically must regularly visit a rehabilitation clinic, where a specialist physiotherapist assists the patient through the use of various exercise machines and devices. The patient may also be guided through manual exercise by the physiotherapist. However, once the session is complete, the patient typically returns to a wheelchair and receives no further exercise until the next rehabilitation session.

Various types of exoskeleton apparatus are known that may be used for patients. For example, exoskeletons may be provided for the arms or legs of a user. Where a user has full use of the limb supported by the exoskeleton, the exoskeleton may be used to enhance natural abilities, for example to carry a heavy load. In other cases, where the user has impaired use of the limb supported by the exoskeleton, the exoskeleton may be used for rehabilitative purposes or to replicate full function.

Typically, an exoskeleton for the legs includes a body portion that contacts a user's torso or waist, an upper leg portion moveably mounted to the body portion, and a lower leg portion moveably mounted to the upper leg portion.

Exoskeletons may also be powered, in which case they may have one or more motors coupled to gears or pulleys configured to move the upper and lower leg portions to facilitate the user's desired motion, such as walking.

SUMMARY

This summary is intended to introduce the reader to the more detailed description that follows and not to limit or define any claimed or as yet unclaimed invention. One or more inventions may reside in any combination or subcombination of the elements or process steps disclosed in any part of this document including its claims and figures.

In a broad aspect, there is provided a method of controlling an exoskeleton apparatus with at least one actuator for manipulating a limb of the exoskeleton, the method comprising: providing a plurality of sensors coupled to the exoskeleton, each of the sensors configured to detect a physiological characteristic; receiving input signals from each of the sensors to generate an input profile; mapping the input profile to a selected profile of a plurality of movement profiles, each of the movement profiles corresponding to a control action, wherein each of the movement profiles includes one or more expected values from at least two of the sensors; and implementing the control action.

In some embodiments, the method further comprises re-generating the input profile periodically. The mapping may be repeated each time the input profile is re-generated.

In some embodiments, at least one of the movement profiles is associated with an active mode of the exoskeleton, and implementing the control action comprises providing a control signal to the at least one actuator when the selected profile is associated with the active mode.

In some embodiments, at least one of the movement profiles is associated with an inactive mode of the exoskeleton, and implementing the control action comprises providing no control signal to the at least one actuator when the selected profile is associated with the inactive mode.

In some embodiments, the physiological characteristic is a positional characteristic for at least one of the sensors.

In some embodiments, the plurality of sensors comprises at least one accelerometer, and the positional characteristic comprises an acceleration.

In some embodiments, the plurality of sensors comprises at least one gyroscope, and the positional characteristic comprises at least one characteristic selected from the group consisting of roll, yaw and pitch.

In some embodiments, the plurality of sensors comprises at least one force sensor, and the physiological characteristic is a force.

In some embodiments, the input profile comprises an indication of a previous In some embodiments, the input profile comprises an interface input indication.

In some embodiments, each of the movement profiles is predefined based on possible movements of the exoskeleton.

In some embodiments, each of the movement profiles is predetermined based on at least one patient characteristic.

In some embodiments, the plurality of movement profiles are stored in a memory of the apparatus.

In another broad aspect, there is provided an apparatus for controlling an exoskeleton with at least one actuator for manipulating a limb of the exoskeleton, the apparatus comprising: a plurality of sensors coupled to the exoskeleton, each of the sensors configured to detect a physiological characteristic; a controller configured to receive input signals from each of the sensors; and a processor configured to: generate an input profile based on the input signals; map the input signals to a selected profile of a plurality of movement profiles, each of the movement profiles corresponding to a control action, wherein each of the movement profiles includes one or more expected values from at least two of the sensors; and implement the control action.

In some embodiments, the processor is further configured to re-generate the input profile periodically. The processor may be further configured to repeat the mapping each time the input profile is re-generated.

In some embodiments, at least one of the movement profiles is associated with an active mode of the exoskeleton, and the control action is implemented by providing a control signal to the at least one actuator when the selected profile is associated with the active mode.

In some embodiments, at least one of the movement profiles is associated with an inactive mode of the exoskeleton, and the control action is implemented by providing no control signal to the at least one actuator when the selected profile is associated with the inactive mode.

In some embodiments, the physiological characteristic is a positional characteristic for at least one of the sensors.

In some embodiments, the plurality of sensors comprises at least one accelerometer, and the positional characteristic comprises an acceleration.

In some embodiments, the plurality of sensors comprises at least one gyroscope, and the positional characteristic comprises at least one characteristic selected from the group consisting of roll, yaw and pitch.

In some embodiments, the plurality of sensors comprises at least one force sensor, and the physiological characteristic is a force.

In some embodiments, the input profile comprises an indication of a previous movement profile.

In some embodiments, the apparatus further comprises a patient input interface, wherein the input profile comprises an interface input indication from the patient input interface.

In some embodiments, each of the movement models is predefined based on possible movements of the exoskeleton.

In some embodiments, each of the movement profiles is predetermined based on at least one patient characteristic.

In some embodiments, the apparatus further comprises a memory configured to store the plurality of movement models.

In another broad aspect, there is provided a non-transitory computer readable medium storing program instructions which, when executed by a processor, cause the processor to carry out a method of controlling an exoskeleton apparatus with at least one actuator for manipulating a limb of the exoskeleton, wherein a plurality of sensors are coupled to the exoskeleton, each of the sensors configured to detect a physiological characteristic, the method comprising: receiving input signals from each of the sensors to generate an input profile; mapping the input profile to a selected profile of a plurality of movement profiles, each of the movement profiles corresponding to a control action, wherein each of the movement profiles includes one or more expected values from at least two of the sensors; and implementing the control action.

It will be appreciated by a person skilled in the art that an exoskeleton may embody any one or more of the features contained herein and that the features may be used in any particular combination or sub-combination.

BRIEF DESCRIPTION OF THE DRAWINGS

The drawings included herewith are for illustrating various examples of articles, methods, and apparatuses of the teaching of the present specification and are not intended to limit the scope of what is taught in any way.

In the drawings.

Figure 1:
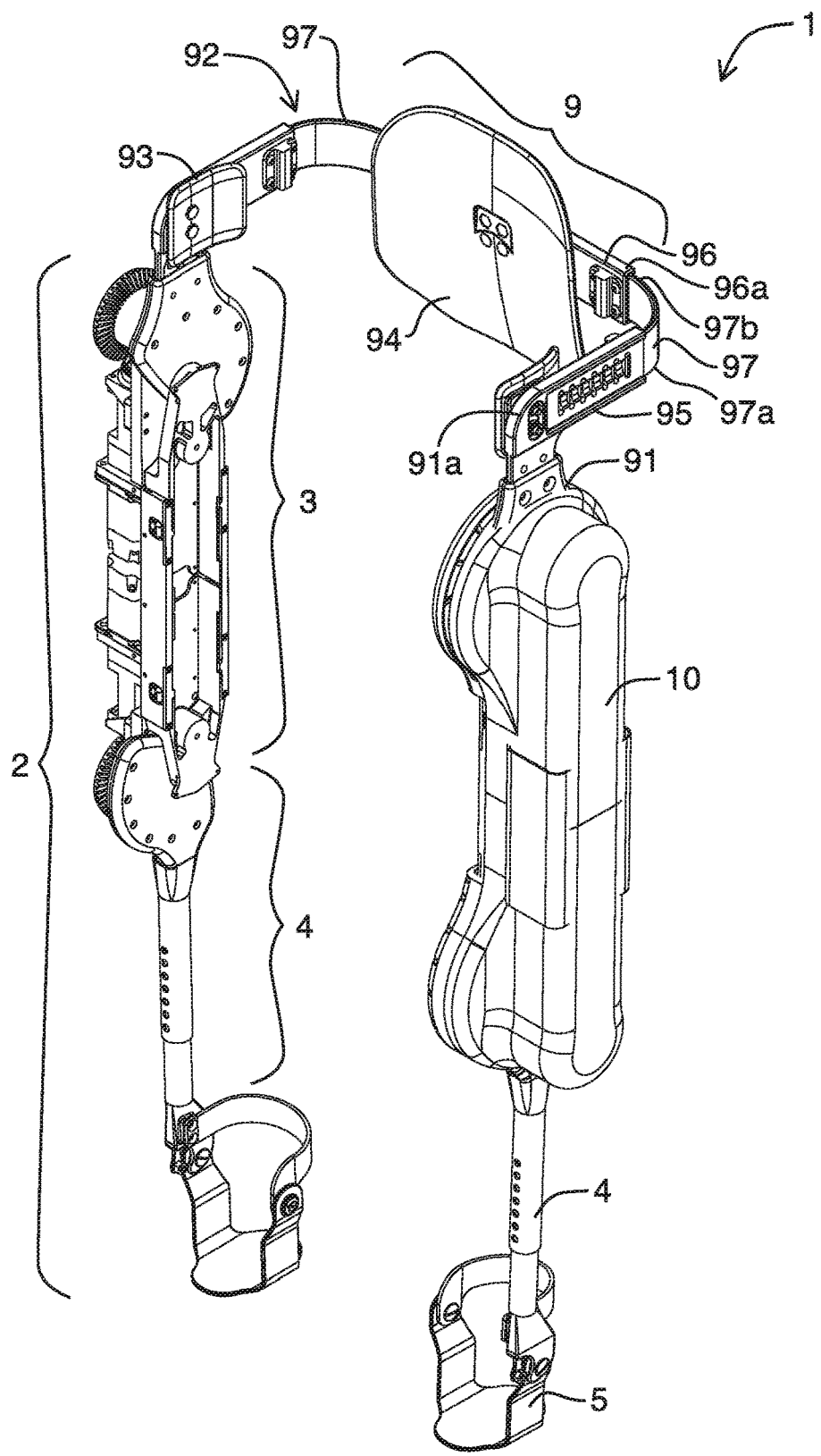
FIG. 1 is a perspective view of an example exoskeleton apparatus with the outer cover of the gear housing cover of one limb removed.
Figure 2:
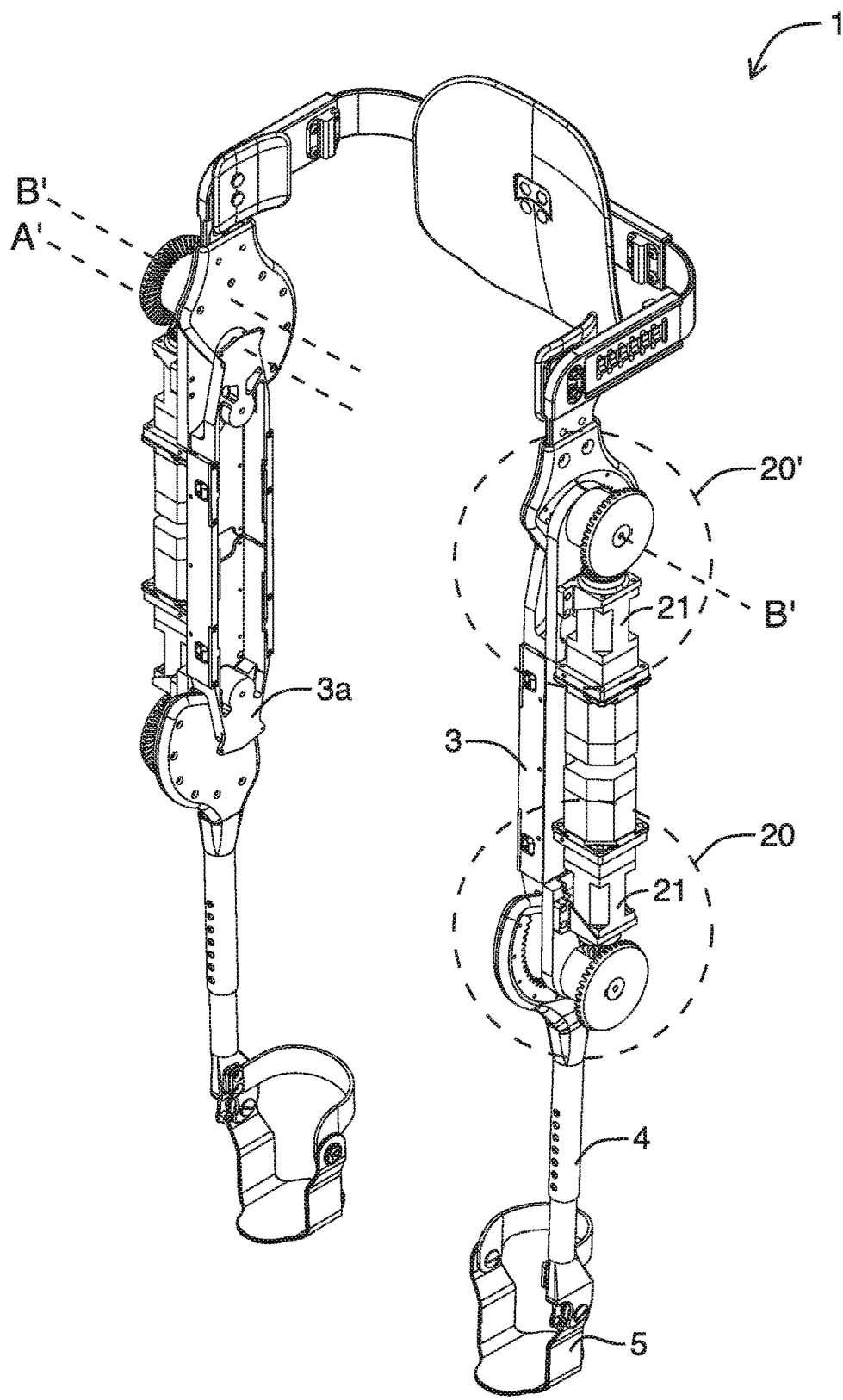
FIG. 2 is a perspective view of the example exoskeleton apparatus of FIG. 1 with the outer cover of the gear housing cover of both limbs removed.
Figure 3:
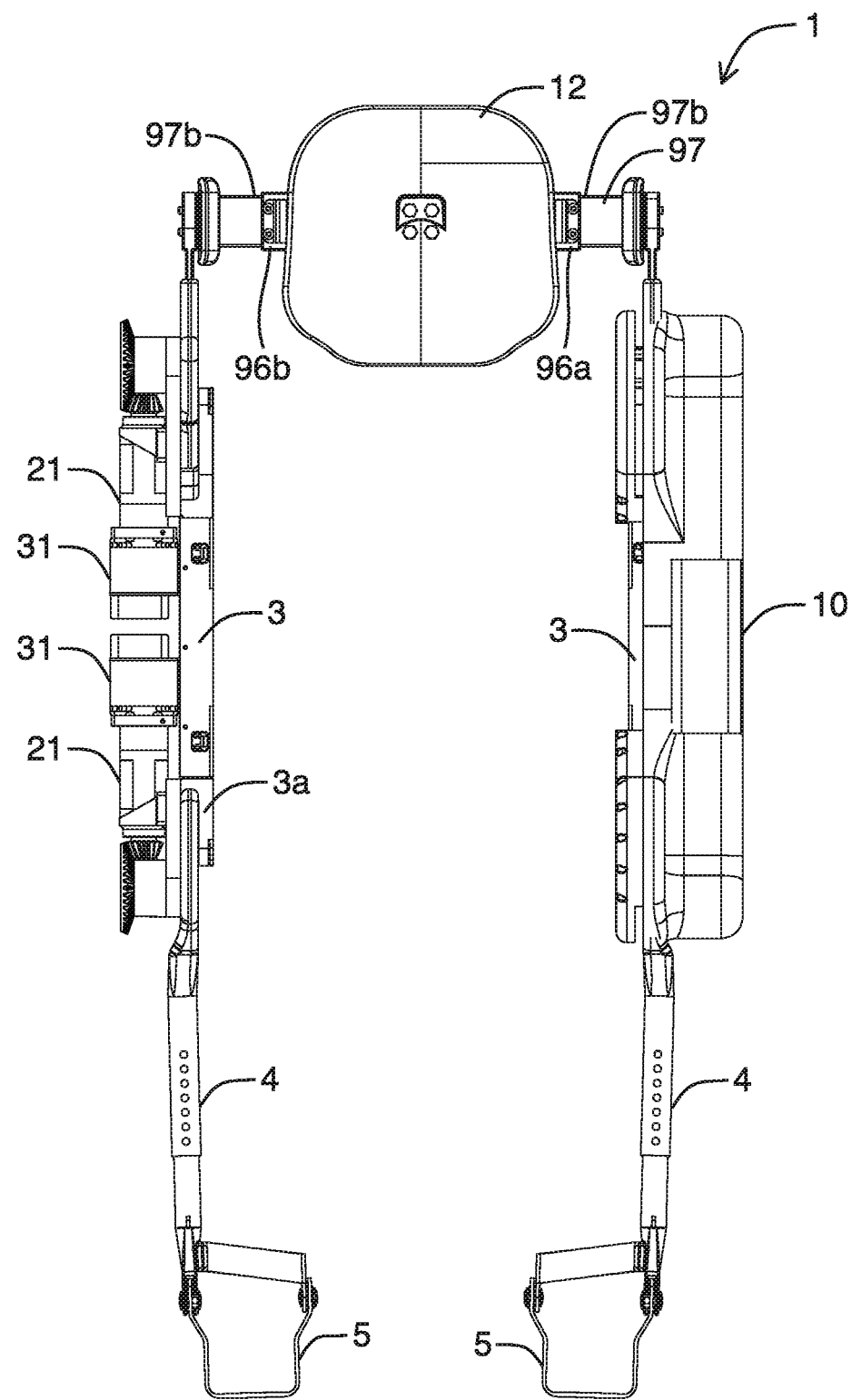
FIG. 3 is a front view of the exoskeleton of FIG. 1.
Figure 4:
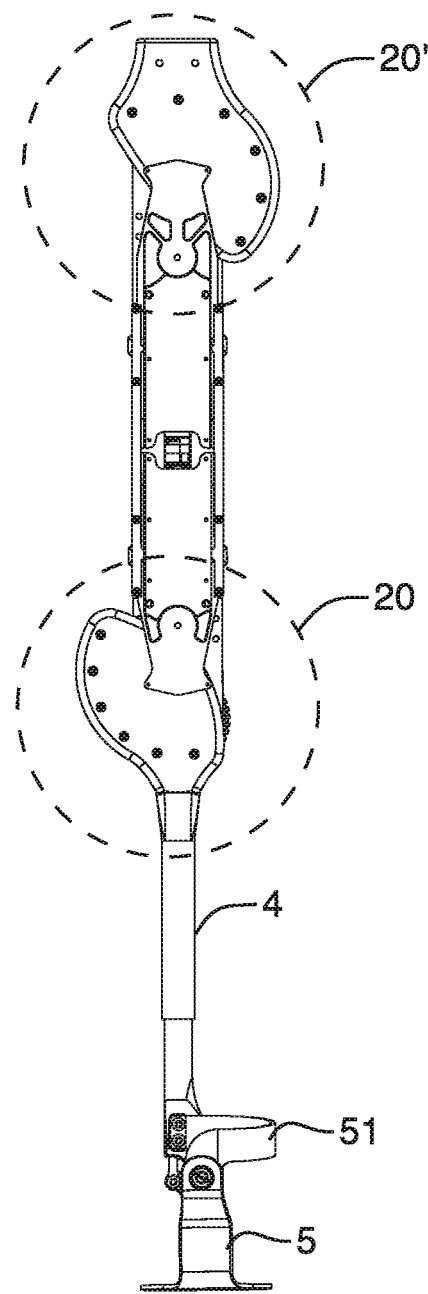
FIG. 4 is an inside side view of a leg structure of the exoskeleton of FIG. 1.
Figure 5:
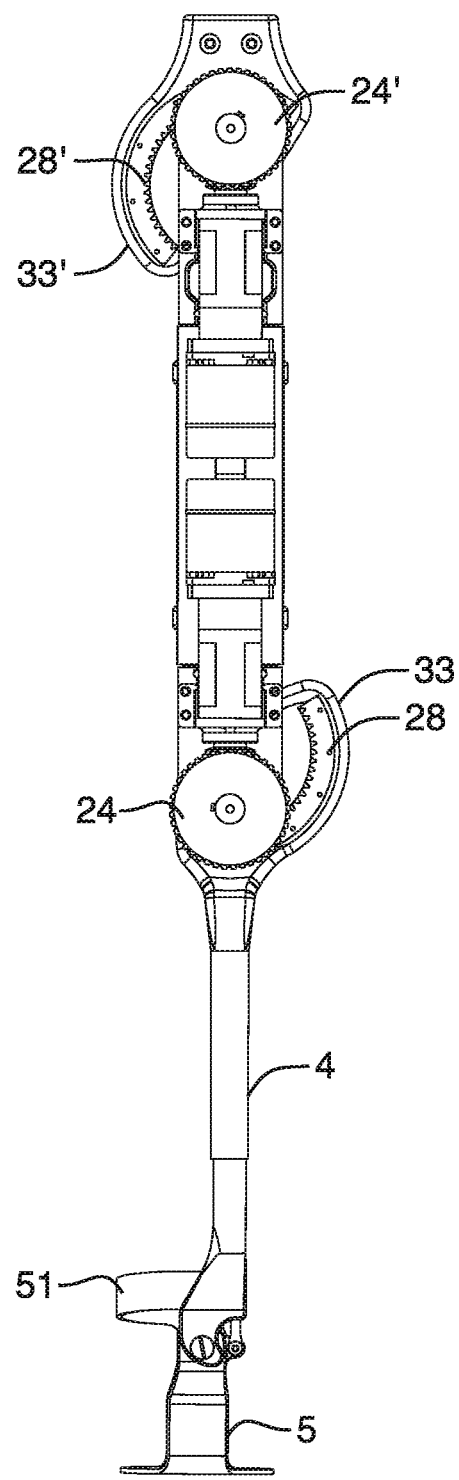
FIG. 5 is an outside side view of the leg structure of FIG. 4 with the gear housing cover removed.
Figure 6:
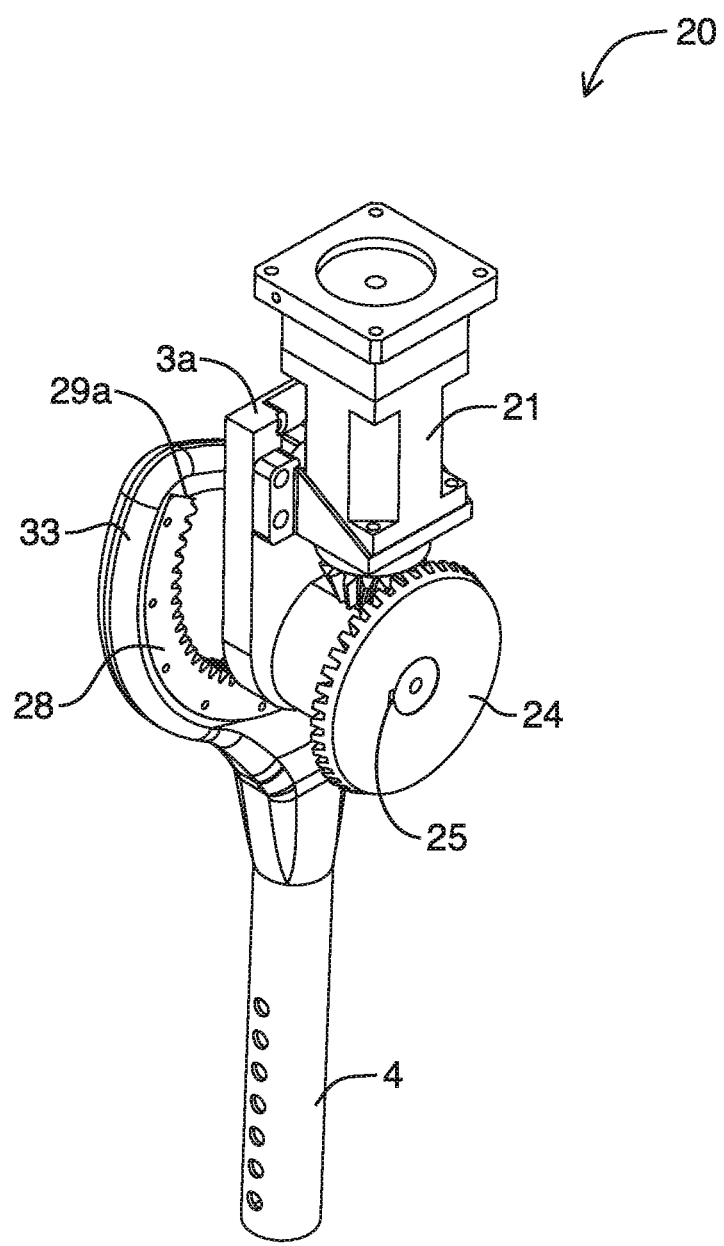
FIG. 6 is a perspective view of an example drive force transmission mechanism for the right leg structure of an exoskeleton.
Figure 7:
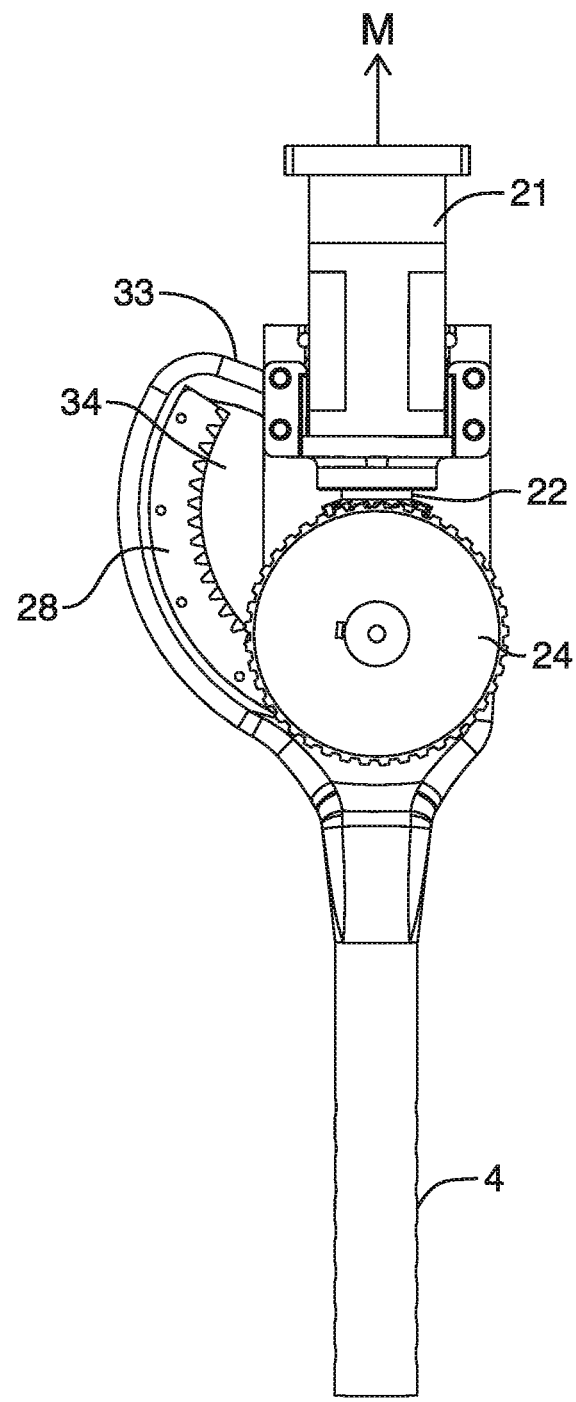
FIG. 7 is a first or outer side view of the drive force transmission mechanism of FIG. 6.

The drawings are provided for the purposes of illustrating various aspects and features of the example embodiments described herein. Where considered appropriate, reference numerals may be repeated among the figures to indicate corresponding or analogous elements.

DESCRIPTION OF EXEMPLARY EMBODIMENTS

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

The described embodiments provide assistive devices suitable for use in supporting and treating paraplegia, by facilitating on-going active rehabilitation. For example, a powered exoskeleton structure is described that supports the patient's legs and torso in an upright position. With the aid of one or more crutches, the patient may stand or walk while using the exoskeleton or may be able to walk just using the exoskeleton. In one embodiment, the exoskeleton may have sensors and a controller that interpret physiological and environmental inputs to allow the patient to, e.g., stand, sit, or walk. For example, physiological inputs may include the angular position of the patient's upper body, balance over both legs, and pressure at the bottom of each foot. Alternately, or in addition if the patient is unbalanced or simply not ready to perform a function, the exoskeleton may remain inactive to avoid injury or unwanted action.

Actuation of the exoskeleton may be provided by electric motors, which may be stepped down with transmissions at each knee or hip joint. In some embodiments, an ankle joint is unpowered, and operates with the aid of a spring-biased mechanism that raises a forward portion of the patient's foot when the rearward portion of the foot is lifted off a walking surface. Power is preferably provided by an on-board battery pack. In other embodiments, a foot plate assembly may not be provided.

The described embodiments are not limited to use by paraplegic patients. Patients with other illnesses or conditions may also benefit from the use of an exoskeleton. For example, patients with middle stage amyotrophic lateral sclerosis (ALS), multiple sclerosis, muscular dystrophy, stroke, or other neurological impairments may benefit from the exoskeleton. Moreover, the exoskeleton may also be beneficial in the treatment of musculoskeletal injuries, such as muscle, tendon or ligament injuries.

It will be appreciated that the exoskeleton may be provided with only one leg structure. For example, a user may only have one limb that has impaired movement or control of movement. It will also be appreciated that the exoskeleton may be designed for a user who has difficulty with the movement of only one joint—such as the hip or the knee. In such a case, the exoskeleton may be configured so as to provide motorized assist for only that joint. It will also be appreciated that the same mechanisms may be used for an exoskeleton that is designed for use with one or both arms of a user. For example, the exoskeleton may have limb structure that is configured to be connected to an arm of a user.

While the described embodiments generally relate to an exoskeleton for the legs of a paraplegic user, an exoskeleton for a quadriplegic user can similarly be provided through the addition of additional joints and motors (e.g., at the hip or waist and at the arms).

General Description of an Exoskeleton Apparatus

Referring to FIGS. 1-5, an example embodiment of exoskeleton 1 is shown. In the embodiment shown, the exoskeleton apparatus is an exoskeleton for both legs of a user. In alternate embodiments, the exoskeleton apparatus may also or alternately include arm and/or upper torso structures (e.g., for a quadriplegic patient), or may be a partial exoskeleton for only one limb or only one joint of one limb.

In the illustrated example, the exoskeleton 1 includes a body portion or support structure 9 that is moveably connected to two limb structures 2. Limb structure 2 comprises an upper limb portion 3 and a lower limb portion 4 and may be configured to support an arm or leg of a user. Upper limb portion may be moveably and drivingly connected both to body portion 9 and a lower limb portion 4. Limb structure 2 may also comprise a foot portion including a foot plate 5, which may be moveably connected to lower limb portion 4. As exemplified, limb structures 2 are of the same construction. However, it will be appreciated that limb structures 2 may differ. It will also be appreciated, for example, that in some embodiments, a lower limb structure may not be required.

Each of upper limb portion 3, lower limb portion 4 and body portion 9 may be formed of a metal, metal alloy, plastic, composite or another suitable material, or combinations thereof. Each portion may be formed of a single contiguous element, or may comprise multiple elements coupled together.

In some embodiments, body portion 9 includes a hip portion 91 and a waist portion 92, which are generally coupled together. Body portion 9 may also have hip rests 93 and a back rest 94 provided thereon for user comfort. Hip rests 93 and back rest 94 may be provided in various suitable configurations. Extruded foam or another suitable material may be used to form the hip and back rests. Alternately, these may be rigid members (e.g., formed of a metal, metal alloy, plastic, composite or another suitable material) which may be padded (e.g., foam or other deformable material). It will be appreciated that the body portion 9 may be used by itself. It will also be appreciated that the different aspects disclosed herein may be used without a body portion 9 or any bory portion known in the art.

In some embodiments, as exemplified in FIG. 1, body portion 9 is configured such that no shoulder harness is provided. Accordingly, weight is not transmitted from the user's upper torso or shoulders to the user's spine. An advantage of this design is that the user may have increased upper body mobility. In addition, the center of gravity of the weight of the exoskeleton experienced by the user will be lower.

Waist portion 92 may be adjustable (e.g., it may be provided with multiple segments) to accommodate users of various body sizes. Accordingly, the elements of waist portion 92 may be rigid members, some or all of which may be moveably connected with respect to adjacent members. As exemplified, waist portion 92 may be provided with a waist adjustment member 95 which has a first end 95*a* that is securable to hip portion extension 91*a* at multiple locations and a second end 95*b* that is securable to a first end 97*a* of side strap 97 at multiple locations. A waist adjustment member 95 may be provided on each side of the exoskeleton. Alternately, or in addition, waist portion 92 may also be provided with a back adjustment member 96 which has a first end 96*a* that is securable to second end 97*b* of side strap 97 at multiple locations and a second end 96*b* that is securable to the second end 97*b* of the side strap 97 on the other side of the exoskeleton at multiple locations. In the illustrated example, waist portion 92 includes several segments that are slidably mated to each other. Multiple holes are provided within the segments, allowing for the waist portion to be adjusted to a desired width and depth. Bolts or other suitable fasteners (e.g., a wing nut) may be provided to fix the waist portion at the desired size. Other sileable or connection mechanisms with multiple connection positions may be used. Accordingly, it will be appreciated that waist portion may be of various constructions that permit the waist portion to be adjusted to the size of a particular user.

Preferably, as exemplified, and particularly with an exoskeleton for use with one or more legs of a user, no shoulder strap or other mechanism is provided. Accordingly, the upper torso of a user does not support any weight of the exoskeleton. In an embodiment wherein a foot plate is provided, the exoskeleton essentially supports its own weight. Accordingly, waist portion 92 may be configured to secure or assist in securing the upper portion of the exoskeleton to the lower torso of the user so it is essentially fixed in relative position to the user during use.

In some embodiments, upper limb portion 3 may provide a support structure upon which one or more motors 21 are provided. Preferably, a motor is provided for each joint that is motorized. Preferably, the motors for the joint of the upper limb and the body and the joint of the upper and lower limb are each provided on the upper limb.

An onboard energy storage member may be provided to provide power for the motors. Any energy storage member may be provided and the energy storage member may be provided at any location on the exoskeleton or it may be remotely positioned to the exoskeleton. For example, a power pack may be carried by a user and may have a cord that plugs into the exoskeleton. The energy storage member may comprise one or more batteries. As exemplified in FIG. 3, batteries 31 may be provided on the upper limb portion 3. In other embodiments, one or more batteries 31 may be provided on the body portion 9. It will be appreciated that, as exemplified, each motor may be provided with its own battery. An advantage of this design is that the weight of the batteries is more evenly distributed. Alternately, a central power pack may be provided which is connected to each motor.

The provision of elements such as motors 21 and batteries 31 on the upper limb portion 3, which is closer to the torso of the user, allows the lower limb portion 4 to be lighter, reducing its mass moment of inertia. Reducing the moment of inertia correspondingly reduces the stress on a user's joints (e.g., knee) that would otherwise result from a heavier lower limb portion.

Upper limb portion 3 may be formed of a single contiguous segment, or may be adjustable in length. For example, in some embodiments, upper limb portion 3 may comprise two end segments coupled by a bracket. For example, they may be telescoping elements or comprise side by side members or brackets. By using an alternate bracket that has a different length, or by connecting the brackets together at different locations (e.g., selecting between differently spaced screw holes in the bracket or end segments), the upper limb portion 3 may be lengthened or shortened to accommodate each user. It will be appreciated that any adjustable segment may be used.

If upper limb portion is drivingly connected to the exoskeleton, then each end of upper limb portion 3 may have a mount and a drive force transmission mechanism 20 may be provided to drivingly connect a motor 21 to an adjacent portion of the exoskeleton on the other side of a joint. For example, the upper end of upper limb portion 3 may have a drive force transmission mechanism 20 to drivingly connect a motor 21 to the upper body portion 9 and the lower end of upper limb portion 3 may have a drive force transmission mechanism 20 to drivingly connect a motor 21 to the lower limb portion 4. Preferably, the portions of the exoskeleton are pivotally connected together. Accordingly, as shown in the illustrated embodiments, the mount comprises a pivot 30 having a pivot axis A, as shown in greater detail in FIG. 8. Pivot 30 may comprise a suitable bearing to facilitate rotational motion of lower limb portion 4 relative to upper limb portion 3 about pivot axis A.

Lower limb portion 4 may be formed of a single contiguous segment, or may be adjustable in length. For example, in some embodiments, lower limb portion 4 may include a telescoping tube structure as illustrated with a plurality of locking positions, and may be lengthened or shortened to accommodate each user. It will be appreciated that lower limb portion may use the same length adjustment mechanism as upper limb portion 3, or it may use a different length adjustment mechanism.

An upper limb cover 10 may be provided to shield portions of exoskeleton 1 from dust and other contaminants, and also to protect moving elements of exoskeleton 1 from external objects. Upper limb cover 10 may be formed of a metal, metal alloy, plastic, composite or another suitable material.

Transmission Construction

In accordance with one aspect of the teachings described herein, the following is a description of a transmission or gear construction, which may be used by itself in any exoskeleton or in any combination or sub-combination with any one or more other aspects disclosed herein including the offset pivot axis construction, the foot plate assembly construction and the air bladder strap construction. Generally, the drive force transmission mechanism 20 is configured to transmit drive force between a motor provided on the upper limb portion and the body portion, and/or between a motor on the upper limb portion and the lower limb portion. Accordingly, in combination, the motor and the drive force transmission mechanism provide a powered joint. In accordance with this aspect, drive force transmission mechanism 20 adapts a rotational force from a motor mounted on the upper limb portion and having a motor axis that is generally parallel to the limb, and transmits it laterally via one or more gears to the body portion or lower limb portion.

An advantage of aligning the output axle of the motor transverse to the transmission direction of the motor to the joint, is that the motor having a lower torque level may be provided and accordingly, a smaller motor may be used. The use of a smaller motor will enable the use of a lighter motor and, using the same on board energy source, a longer operating life may be obtained.

A further advantage of aligning the output axle of the motor transverse to the transmission direction of the motor to the joint is that the profile of the limb structure may be reduced. If the motor axis was aligned with the axis of rotation of the gears, then the motor would extend further outwardly, and increase the clearance that would be required for a user to avoid walls, furniture and the like.

Referring to FIGS. 6-17, an example embodiment of a drive force transmission mechanism 20 is shown for use in an exoskeleton, such as exoskeleton 1, for at least one limb structure corresponding to a limb of a user. FIGS. 6-11 illustrate the complete transmission mechanism 20 along with sub-portions of the upper and lower limb portions. FIGS. 12-17 illustrate a partial drive force transmission mechanism 20, in which selected parts have been omitted to provide a better view of internal components.

Generally, the at least one limb structure may have an upper portion or upper limb portion 3, connected to the body portion 9, or lower limb portion 4, or both. The upper limb portion 3 may be moveably mounted to the body portion 9 and lower limb portion 4 may be moveably mounted to the upper limb portion 3. In at least some embodiments, upper limb portion 3 is pivotally moveably mounted to the body portion 9 and lower limb portion 4 is pivotally moveably mounted to the upper limb portion 3

In the example shown, exoskeleton 1 has a left leg structure and a right leg structure, and a waist member or body portion 9. The exoskeleton may be secured to the user by any means known in the art. Preferably, a plurality of straps may also be provided at various positions on the exoskeleton. For example, straps may be provided for securing the user to the leg structures to thereby transmit the user's weight to the exoskeleton by the left and right leg structures. A waist strap may also be provided to secure the exoskeleton to the lower torso of a user. In some embodiments, the straps may include at least one inflatable pocket to enhance comfort and to distribute pressure on the user's limbs or torso.

In accordance with this aspect, a drive motor 21 may be provided on the upper limb portion 3. Drive motor 21 has a motor axis M that extends generally parallel to the upper limb portion 3. More particularly, drive motor 21 is oriented such that the motor output axle 22 is generally parallel to the longitudinal axis of upper limb portion 3. This facilitates a compact and efficient arrangement of elements on the exoskeleton 1.

Drive motor 21 may be mounted to or proximate upper limb portion end 3a or output axle 22 may have a sufficient length such that drive gear 23 is positioned to drivingly engage driven gear 24.

In some embodiments, drive motor 21 may incorporate, or be coupled to, a planetary gear box to decrease the output speed of a motor output axle 22 while increasing its torque.

In the illustrated example of FIGS. 6-17, the drive force transmission mechanism 20 shown is a rotary motion drive force transmission mechanism used to drivingly connect the drive motor 21 to the lower limb portion 4 of exoskeleton 1 (e.g., at a knee joint). More particularly, lower limb portion 4 is moveably mounted and, preferably, pivotally mounted to upper limb portion 3.

Drive force transmission mechanism 20 comprises a first gear or driven gear 28 provided on an upper end of the lower limb portion 4. The driven gear 28 may be any gear coupled to the lower limb portion 4. The gear may be an internal gear. It is preferred that the gear has a constant arc, and may provide a travel distance of between 10-150° or between 30-150°. The travel distance may vary depending upon the joint and is preferably selected to permit a normal range of motion of the joint (preferably while walking and moving into and out of a sitting position).

Drive force transmission mechanism 20 further comprises a first transfer member extending transverse to the motor axis M.

In some embodiments, the first transfer member may comprise a single transverse gear, e. g., a gear to transfer the rotary output from the drive motor transverse or laterally to the lower limb portion. For example, drive gear 23 provided on the motor output axle 22 may drivingly engage such a transverse gear and the transverse gear may directly drivingly engage driven gear 28. Alternately, drive gear 23 may directly drivingly engage driven gear 28 or an extension thereof. However, in other embodiments, including the example shown, the transfer member comprises a transfer shaft 26, which has a drive gear 27 provided thereon at a first end, and a driven gear 24 provided thereon at a second opposing end. The drive gear 27 is drivingly connected to the driven gear 28. One or both of drive gear 27 and driven gear 28 may be helical gears, while in other embodiments they may be spur gears or other suitable gear. Helical gears offer the advantage of quieter operation relative to spur gears.

Driven gear 24 is driven by a drive gear 23 provided on the motor output axle 22, which is mounted transversely to transfer shaft 26. In the illustrated example, drive gear 23 and driven gear 24 are bevel gears. Drive gear 23 is non-rotatably mounted to motor output axle 22, for example using a shearable key. Drive gear 23 may be a bevel gear for drivingly coupling with a driven gear 24, which is also beveled. In other embodiments, drive gear 23 may be drivingly coupled to driven gear 24 using other configurations, such as a worm gear.

To prevent injury to the user from over-torque conditions, at least one of the gears, and preferably one of the driven gear 24 and drive gear 27 is shearably mounted to transfer shaft 26, e.g., it may be non-rotatably mounted to transfer shaft 26 using a shearable key 25. Similarly, drive gear 23 may be non-rotatably mounted to motor output axle 22 using a shearable key. The shearable keys can be formed of a material, such as a soft metal alloy, that deforms and shears when a predetermined force is applied, where the predetermined force is selected to be lower than is likely to cause injury to the user, or damage to exoskeleton components, or both.

In some embodiments, the drive force transmission mechanism provides a gear reduction of from 1:200 to 1:600. In some embodiments, the drive force transmission mechanism provides a gear reduction of from 1:300 to 1:500.

In some embodiments, driven gear 28 is an internal gear (i.e., the gear teeth are provided on an interior side and not an exterior side). It will be appreciated that an internal gear may extend in a full circle and may have teeth on part or all of the inner surface. Alternately, as exemplified, internal gear 28 is constructed as an arc. In such an embodiment, a gear housing 33 may be provided at an end of the lower limb portion 4, to surround an outer portion of driven gear 28 and preferably to close the open end of an arc shaped drive gear 28 so as to define an enclosed interior space 34 (see FIG. 11). Accordingly, the internal driven gear 28 has a driven side with teeth which are engaged by the teeth of drive gear 27 on transfer shaft 26 and an opposed side which may be closed by the gear housing 33.

As shown, driven gear 28 may be an internal gear and it may be constructed in several manners. For example, it may be formed as part of gear housing 33 (e.g., an integrally formed unit), or driven gear 28 may be fastened to or within gear housing 33. The gear housing may be provided with a back plate 35 that closes the lateral side of opening 34 opposed to that of transfer shaft 26. The gear housing 33 and back plate 35 protect the internal gear from becoming entangled with articles of the user's clothing, or from other external environmental elements. Driven gear 28 may be formed as port of the upper end of lower limb portion 4 or it may be manufactured separately and then attached thereto.

In order to prevent over-rotation of the joint, which could damage a limb of the user, a mechanism may be provided to inhibit or prevent rotation of the joint past a predetermined limit. The limit may be set slightly short of the degree of rotation at which the joint of a user may be damaged from over-rotation. For example, driven gear 28 may have first and second spaced apart gear ends 28*a* and 28*b* and a stop member 29*a* or 29*b* may be provided proximate to one or both spaced apart ends 28*a* and 28*b* of driven gear 28 to stop rotation of the transfer member prior to or at the stop. In some embodiments, the stop member 29*a* or 29*b* may be part of or integral to gear housing 33. The stop member 29*a* or 29*b* may be of any construction and may be provided on any part so as to be engaged by, e.g., drive gear 27 and prevent rotation of drive gear past the stop. If a shearable connector is provided, then the shearable connector may be sheared upon such an occurrence, thereby preventing damage to the joint of the user and the exoskeleton. It will be appreciated that the stop may be designed to provide resistance to rotation so as to cause the shearable connector to shear.

Alternately, or in addition, the mechanism may comprise a controller operatively connected to drive motor 21 which may be configured to prevent rotation of drive gear 27 past one or both the gear ends 28*a* and 28*b*.

Likewise and in similar fashion, a second drive force transmission mechanism 20' may be provided at a hip joint, and may comprise a second transfer member extending transverse to a motor axis of a second drive motor, where the second drive force transmission mechanism 20' drivingly connects the second drive motor to the body portion 9. As exemplified in FIGS. 1-5, upper limb portion 3 is moveably mounted and, preferably, pivotally mounted to body portion 9. In this embodiment, the first gear or driven gear 28 is preferably provided on the body portion 9. For example, driven gear 28 may be provided on the hip portion 91 of body portion 9. In addition, in some embodiments, a gear housing 33 may be provided at an end of the body portion 9.

Accordingly, in some embodiments, the exoskeleton may have two limb structures, one for each leg. As exemplified in FIG. 1, the exoskeleton has a limb structure for the left leg and a limb structure for the right leg. The limb structures are connected to a waist member. The upper limb portion is provided with two motors, one for actuation of the hip joint and one for actuation of the knee joint. One advantage of this design is that sensory receptors are not required in the knee to simulate motor nerves and create a limitation in the range of motion of the knee to protect the cartilage and ligaments associated with the knee of a user from being over rotated.

Another advantage is that the weight of the lower limb portion 4 is reduced and this reduces the forces that are transmitted through the knee joint.

A further advantage is that the lower limb portion 4 may be easier to remove and service or replace. For example, control wiring for a motor need not extend through the knee joint. Further, the lower limb portion may be removable by removing the screws or the like which moveably secure the lower limb portion 4 to the upper limb portion 3 and optionally disengaging the gear on the lower limb portion 4 from the drive force transmission mechanism.

A further advantage is that, by keeping the motors on the upper limb portion 3, and supporting weight by the waist member and/or the upper and lower limb portions, the weight that is transmitted through the ankle joint of the exoskeleton may be reduced thereby the foot plate to be lighter.

Off-Set Pivot Axis

In accordance with another aspect of the teachings described herein, the following is a description of an offset pivot axis, which may be used by itself in any exoskeleton or in any combination or sub-combination with any one or more other aspects disclosed herein, including the transmission construction, the foot plate assembly construction and the air bladder strap construction. Preferably, this construction is used together with the transmission construction.

In accordance with this aspect, the upper limb is pivotally mounted to the lower limb (and/or the body portion) at a position that is vertically spaced from the drive axis of the joint. For example, if the joint uses the transmission construction disclosed herein, then the pivot axis of the joint of the exoskeleton may be vertically offset from the axis of transfer shaft 26. Therefore, the pivot axis of the upper and lower limbs 3, 4 may be above the axis of the transfer shaft 26 for that joint. Similarly, the pivot axis of the upper limbs 3 and the body 9 may be below the axis of the transfer shaft 26 for that joint. It will be appreciated that the pivot axis of the joint of the exoskeleton is preferably proximate the pivot axis of the joint of the limb of the user and preferable located essentially at the joint of the limb of the user.

An advantage of this design is that it allows the drive mechanism at the joint to be sized relatively independently of the constraints imposed by the user's joint. For example, a larger transfer member or gear construction could be used even where it would have a rotational axis that does not align well with the user's own joint. The design may also facilitate increased adjustability for differently sized limbs.

Figure 8:
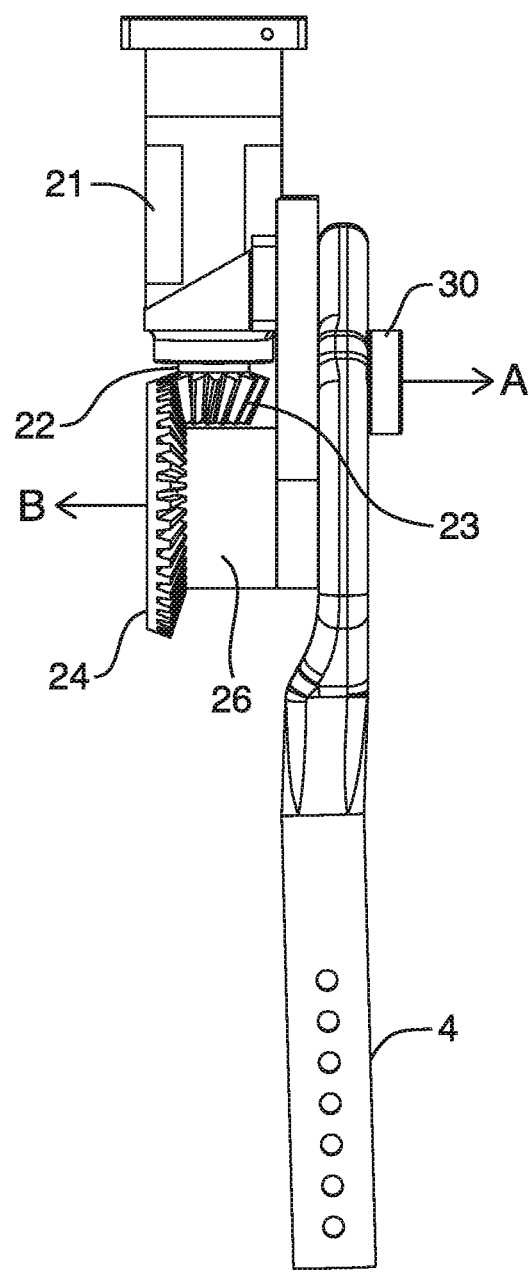
FIG. 8 is a front view of the drive force transmission mechanism of FIG. 6.
Figure 9:
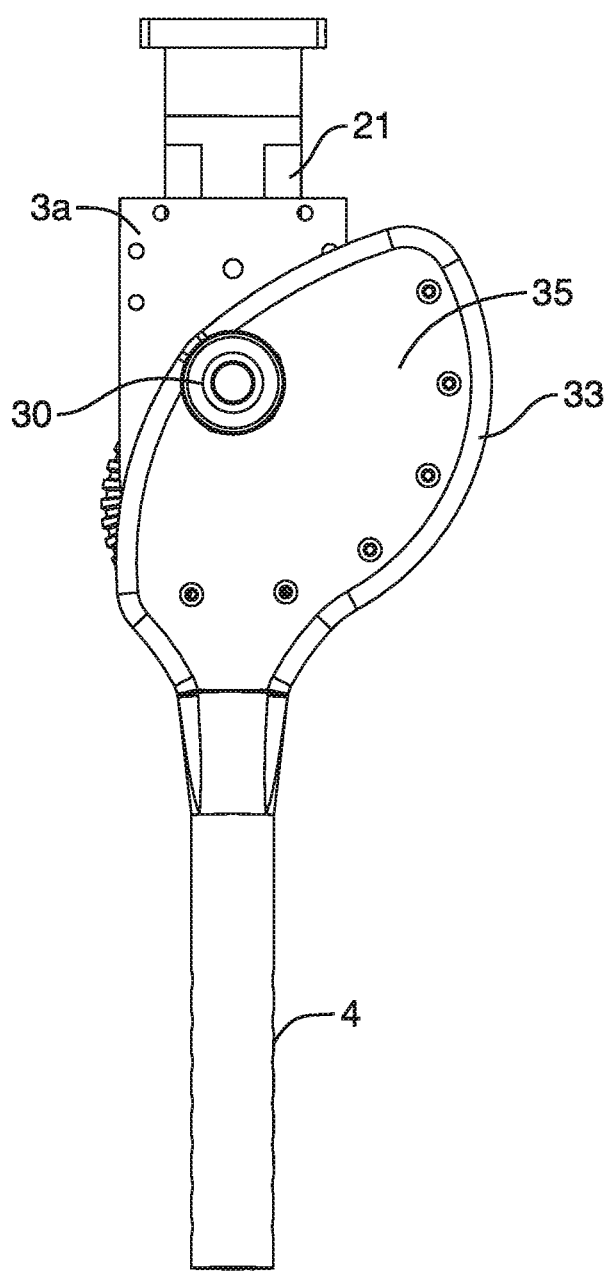
FIG. 9 is a second or inner side view of the drive force transmission mechanism of FIG. 6.
Figure 10:
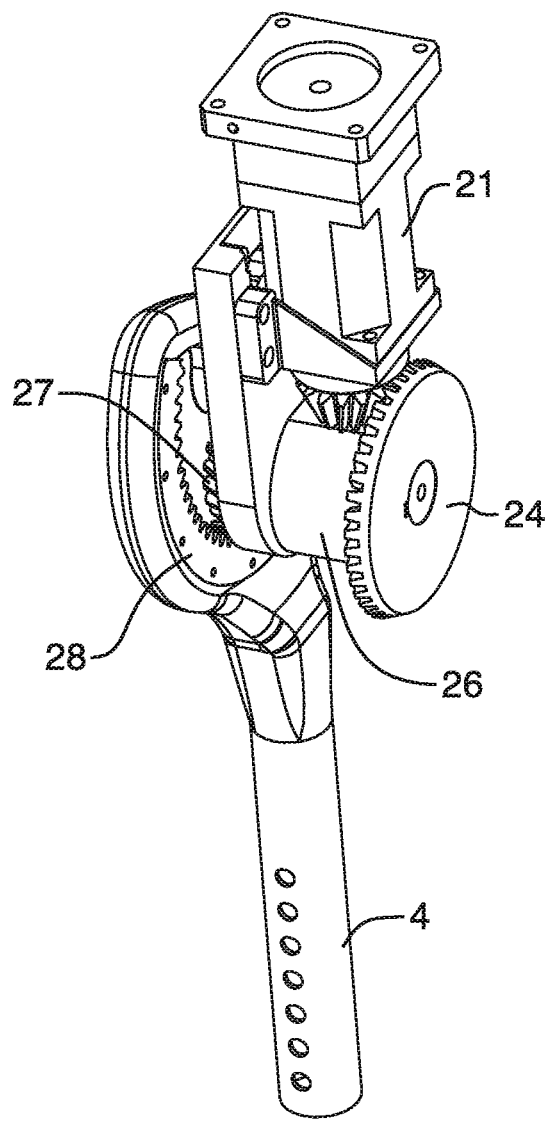
FIG. 10 is a perspective view of an example drive force transmission mechanism for the left leg structure of an exoskeleton.
Figure 11:
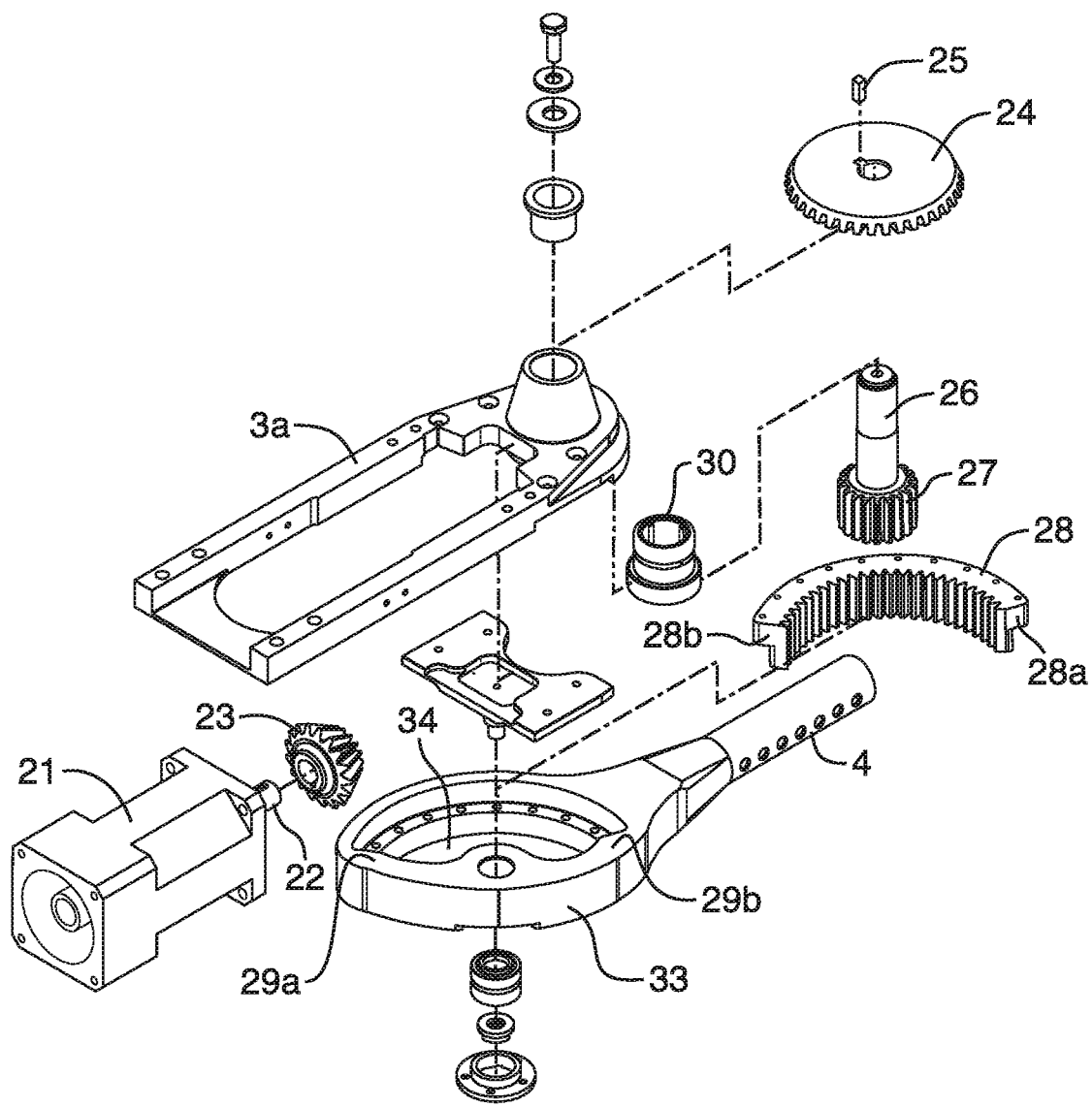
FIG. 11 is an exploded perspective view of the example drive force transmission mechanism of FIG. 6.

In the illustrated example, lower limb portion 4 is pivotally mounted to the upper limb portion 3 about a limb portion pivot axis A (see FIG. 8). Limb portion pivot axis A may be located at any location that extends through a portion of lower limb 4 or an extension thereof, such as drive gear 28 and the associated housing 33, 35. As exemplified, limb portion pivot axis A may be located generally within and at an upper end of housing 33 that surrounds driven gear 28. Pivot axis A may be centered on a bearing 30 that pivotally moveably couples an upper end of lower limb portion 4, such as housing 33, to a lower end of upper leg portion 3, such as upper limb portion end 3a (se FIG. 6).

Figure 12:
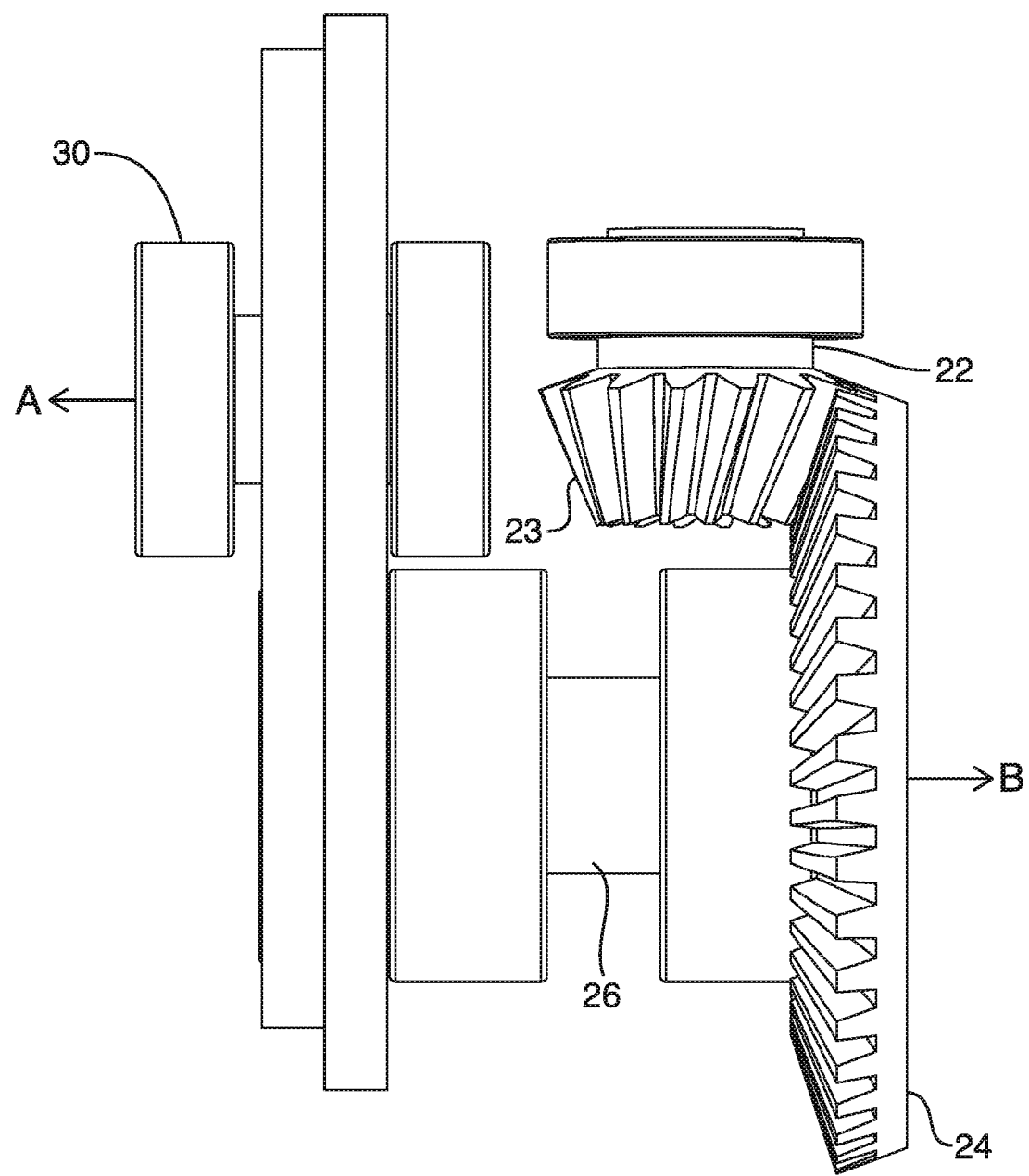
FIG. 12 is a partial enlarged front view of the drive force transmission mechanism of FIG. 6, wherein the drive motor has been removed.
Figure 13:
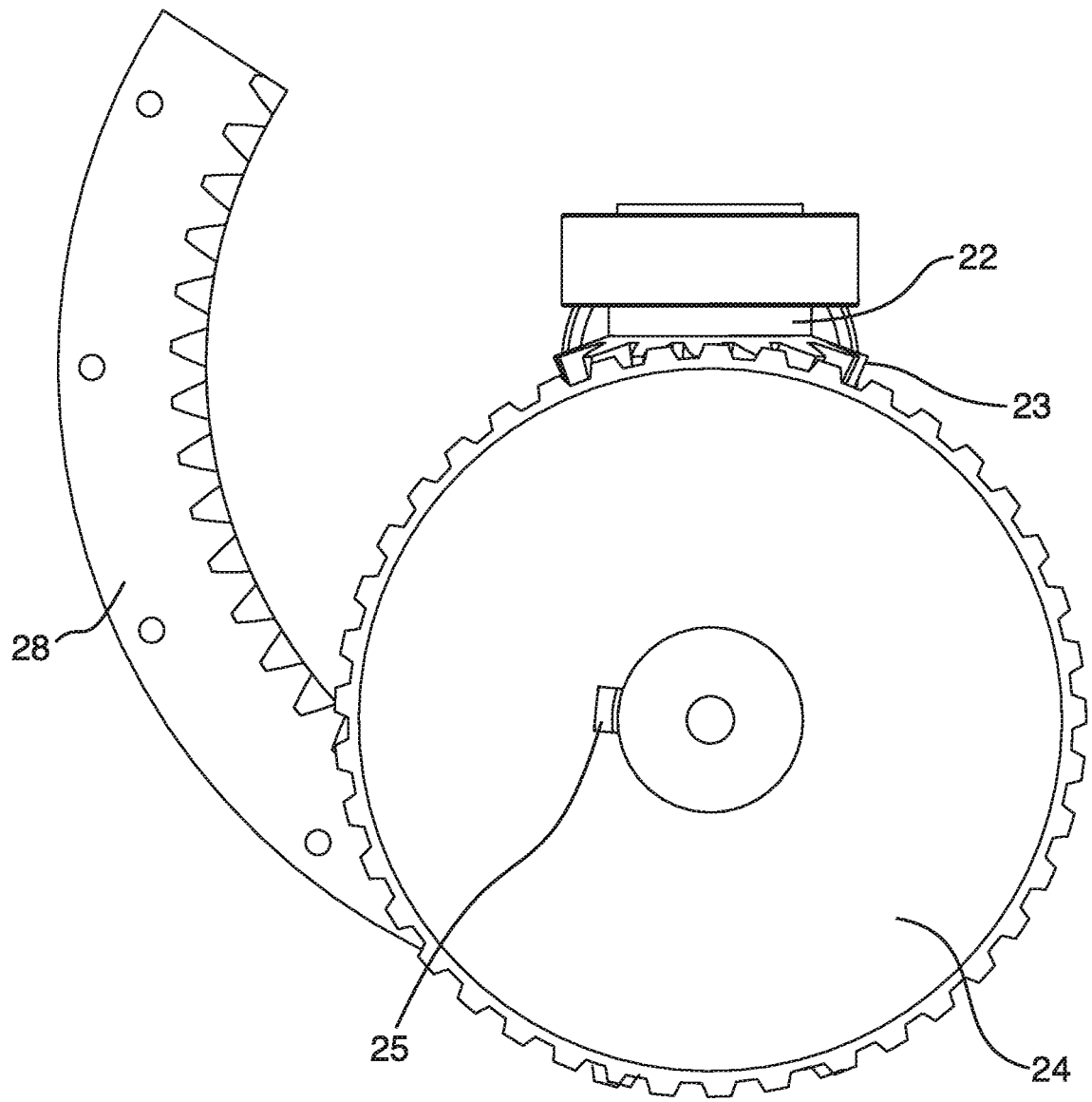
FIG. 13 is an outside side view of the partial drive force transmission mechanism of FIG. 12.
Figure 14:
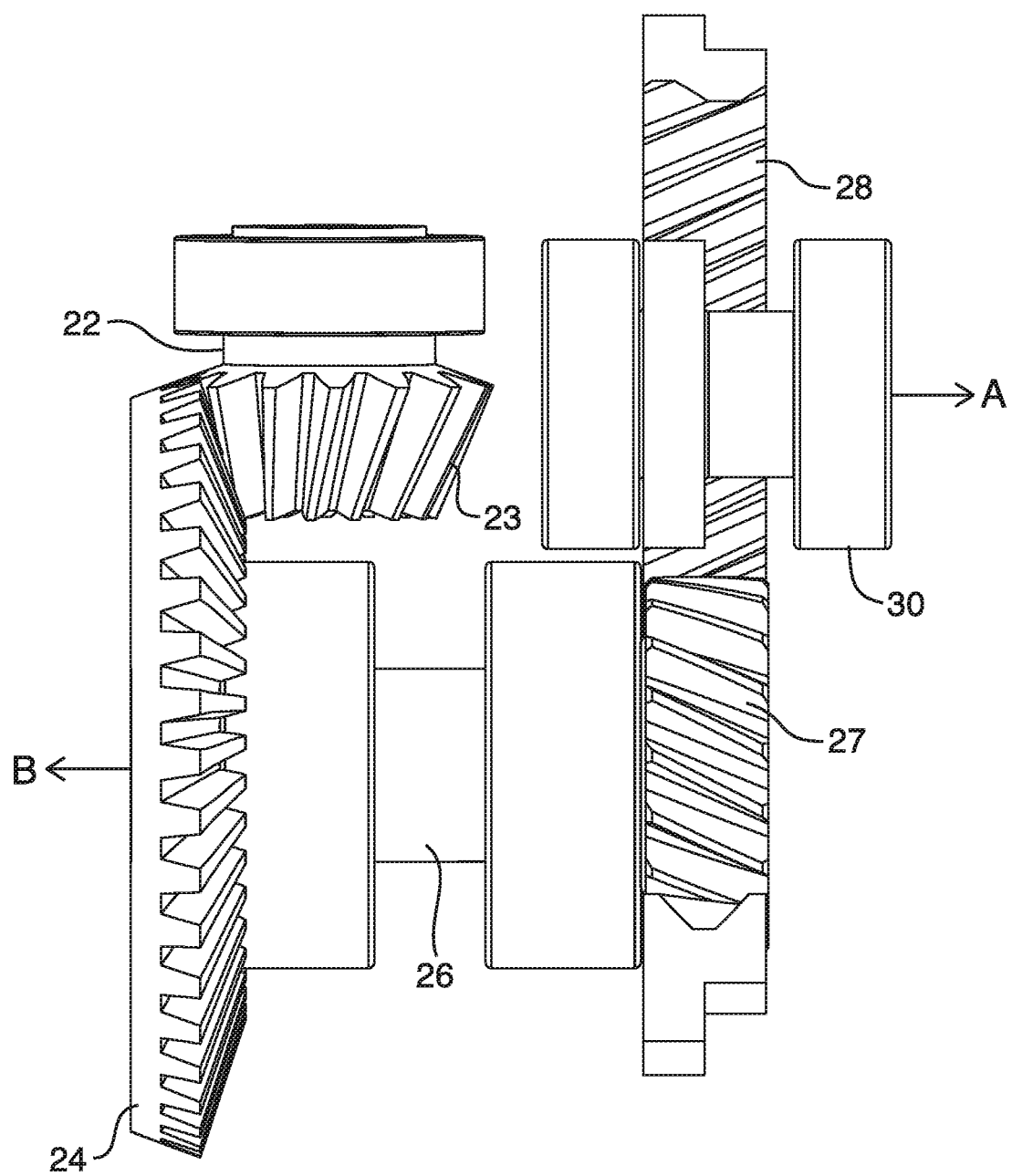
FIG. 14 is a rear view of the partial drive force transmission mechanism of FIG. 12.
Figure 15:
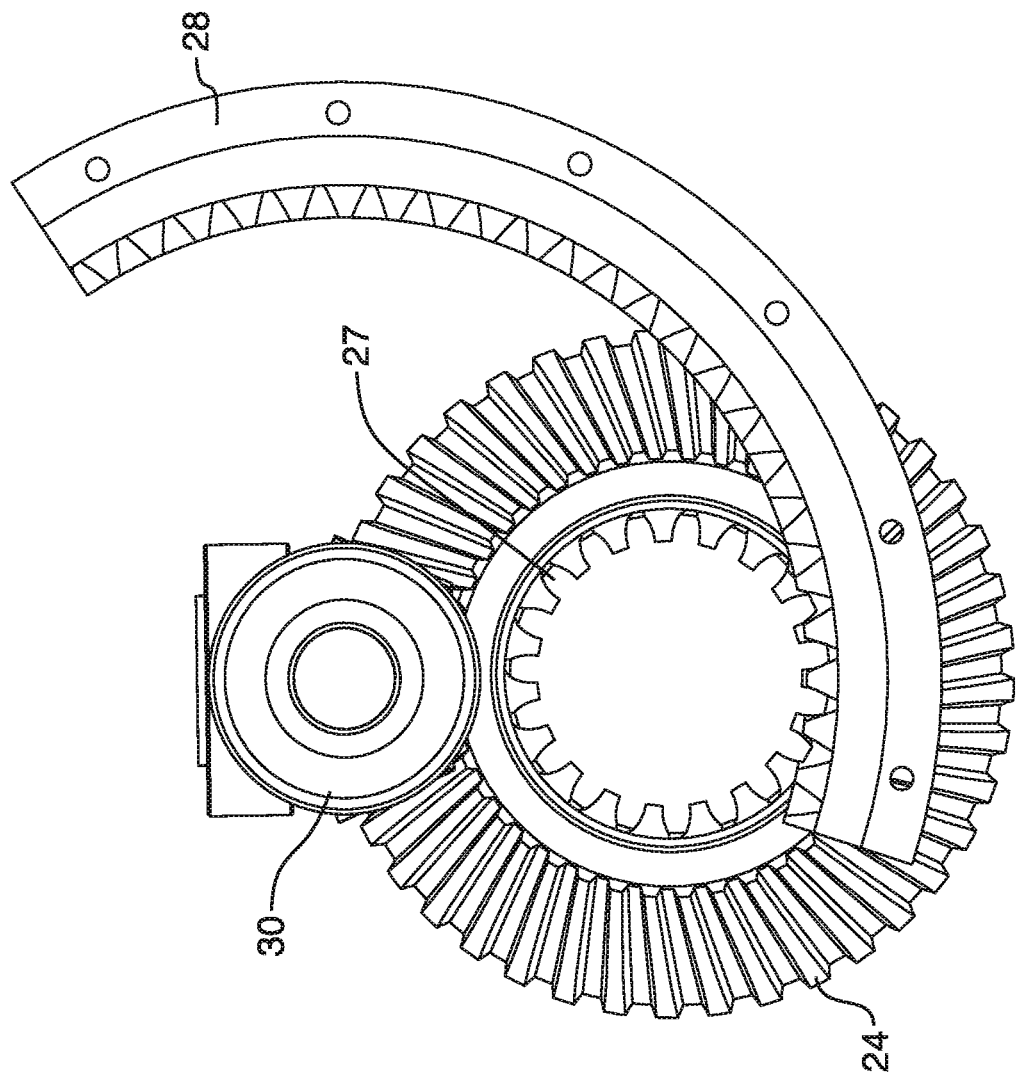
FIG. 15 is an inside side view of the partial drive force transmission mechanism of FIG. 12.
Figure 16:
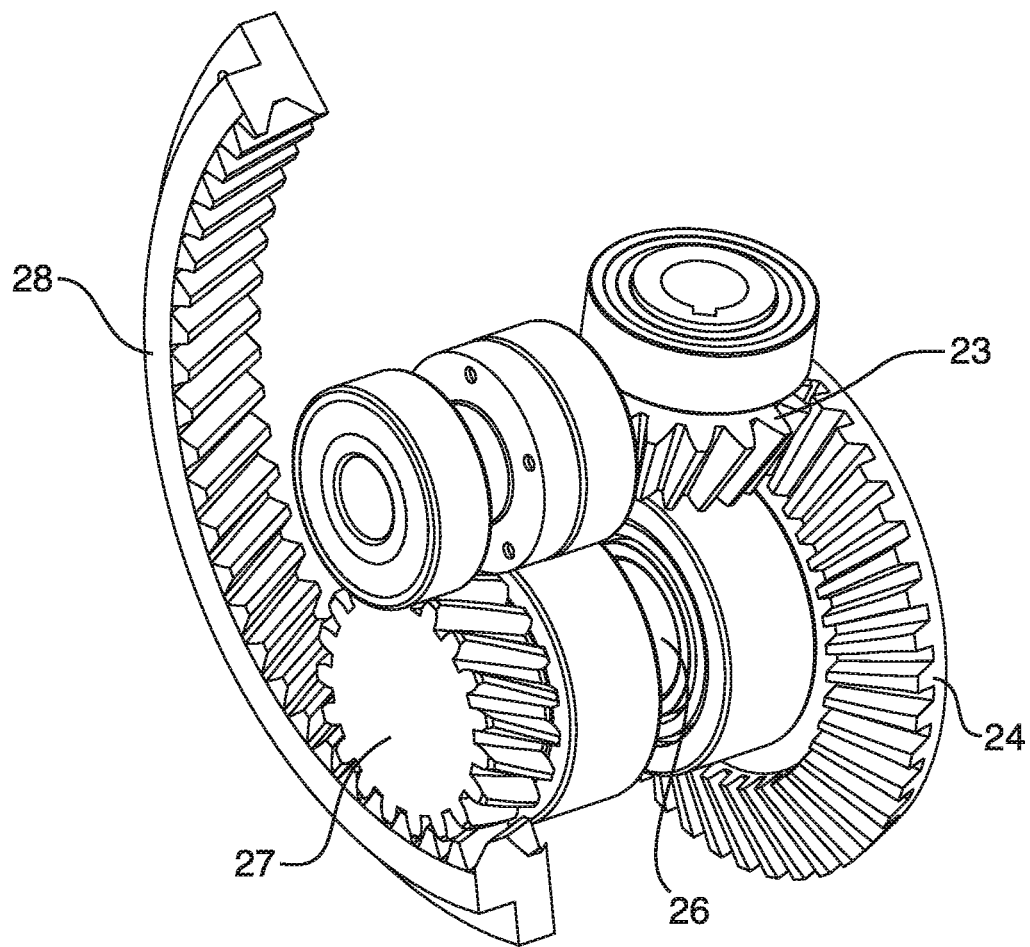
FIG. 16 is a perspective view from the inside of the partial drive force transmission mechanism of FIG. 12 with the drive components outwards of the internal gear removed.
Figure 17:
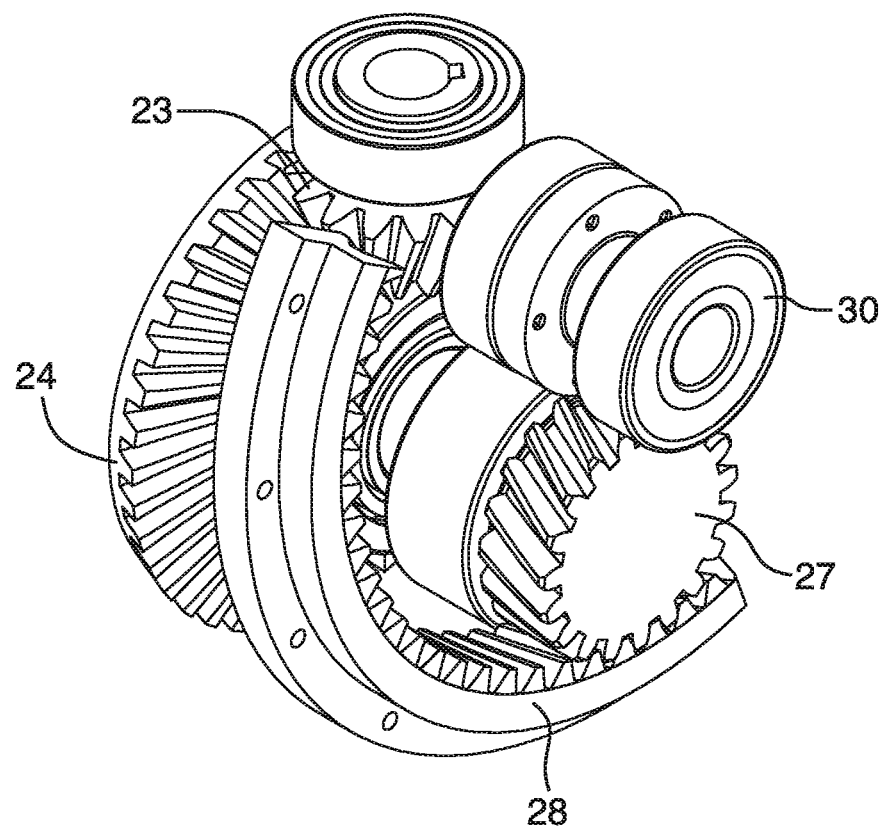
FIG. 17 is a perspective view from the inside of a partial drive force transmission mechanism for the left leg structure of an exoskeleton.
Figure 18:
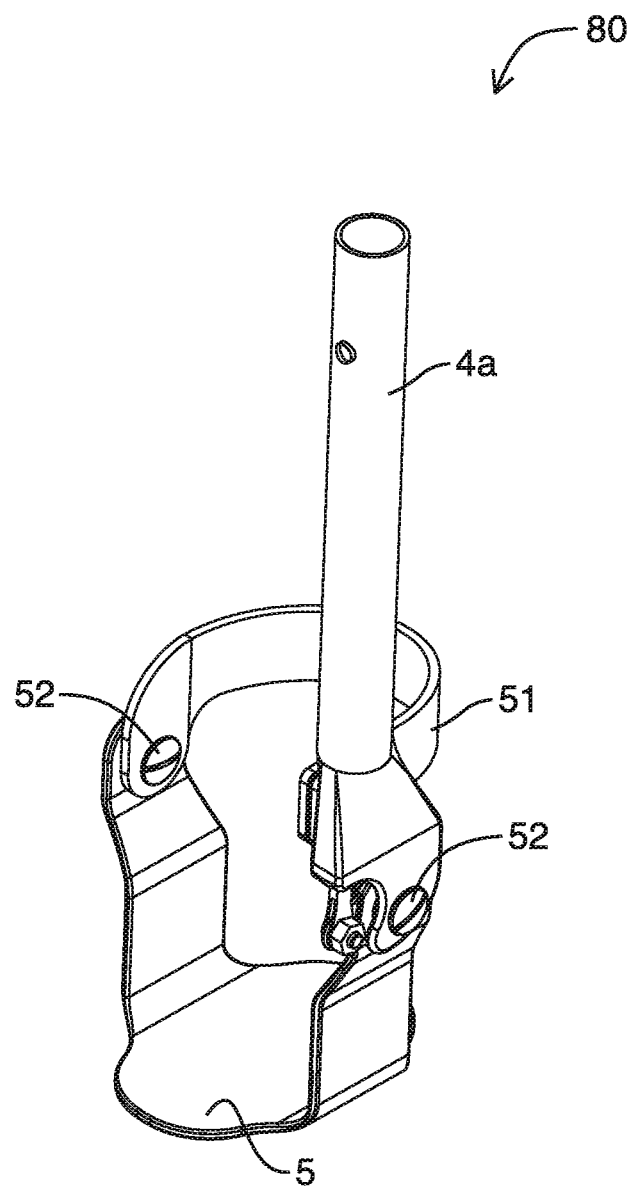
FIG. 18 is a perspective view of a foot portion for the left leg structure of an exoskeleton.
Figure 19:
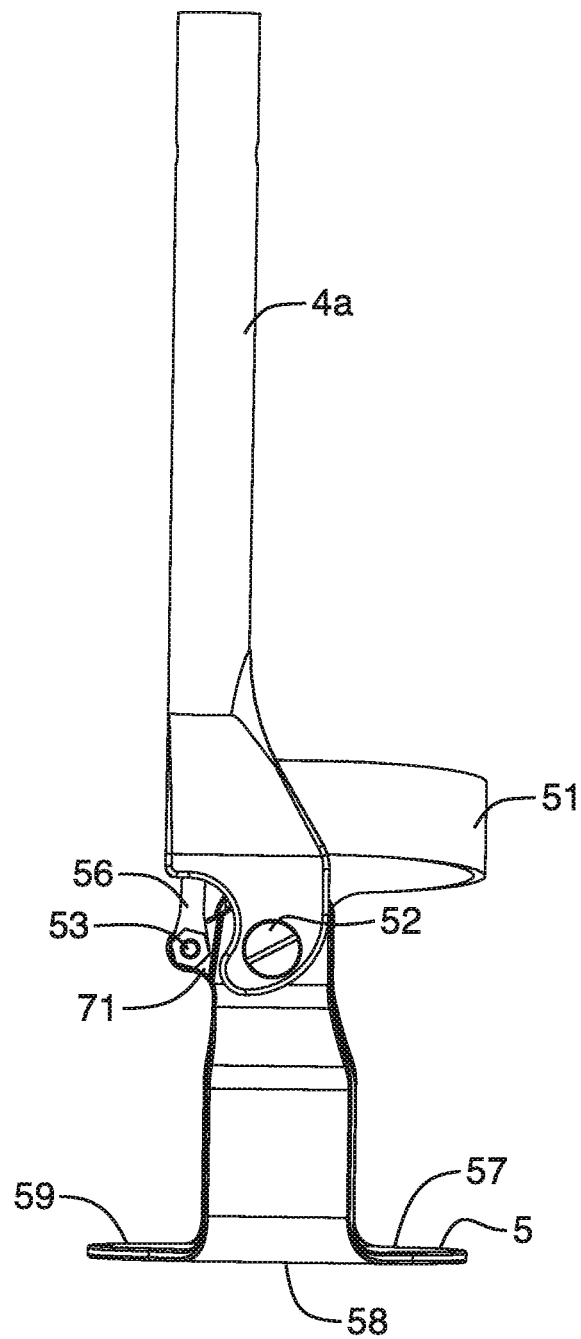
FIG. 19 is an outside side view of the foot portion of FIG. 18.
Figure 20:
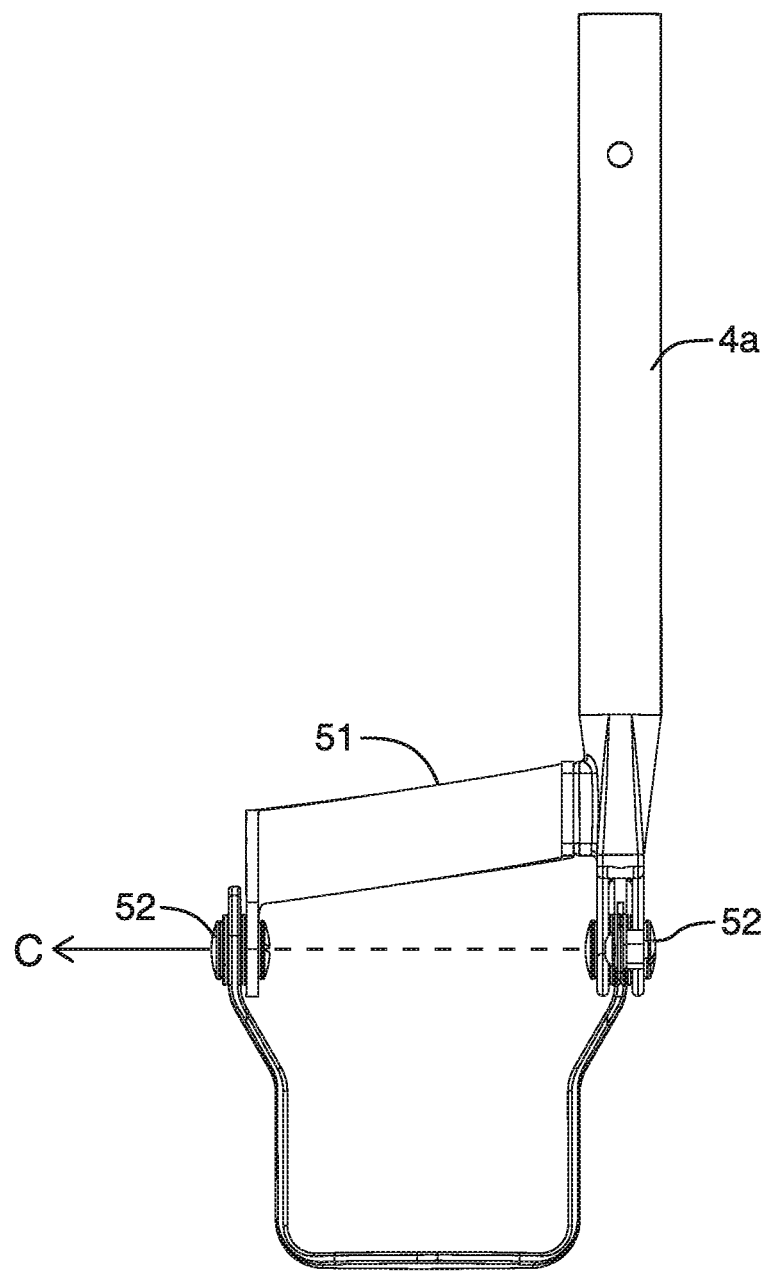
FIG. 20 is a front view of the foot portion of FIG. 18.

As exemplified in FIGS. 8 and 12, limb portion pivot axis A is positioned proximate to and generally above the transfer axis B of the transfer member or transfer shaft 26. Transfer axis B may extend generally parallel to limb portion pivot axis A. However, limb portion pivot axis A is spaced apart from the transfer member or transfer shaft 26, such that limb portion pivot axis A is vertically offset from transfer axis B. Accordingly, in the illustrated example, the lower limb portion 4 is pivotally mounted to the upper limb portion 3 about a limb portion pivot axis A, and the exoskeleton 1 is configured such that the limb portion pivot axis A is positioned proximate to, and generally above, the transfer axis B of the transfer member or transfer shaft 26.

In use, limb portion pivot axis A may be aligned with a natural pivot axis of the user's own knee and secured in this position through the use of straps or the like. Alignment of pivot axis A with the knee's natural pivot axis reduces stress on the knee joint. In contrast, current exoskeleton joints may not offer a rotational axis that is fully aligned with the user's own natural pivot axis, or may have a different rotational arc than the knee joint, such that the knee joint may be stressed at different points in the rotation.

Similarly, in other configurations such as those of drive force transmission mechanism 20', body portion 9 may be pivotally mounted to the upper limb portion 3 about a body portion pivot axis A'. The body portion pivot axis A' may be positioned proximate to, and generally below the axis of the transfer member B'. The transfer member axis may extend generally parallel to the body portion axis A'. However, the body portion axis A' is spaced apart from the transfer member or transfer shaft, such that the transfer member axis B' and body portion axis A' are vertically offset and the body portion axis A' may be positioned below the transfer member axis B' (see for example FIG. 2). As with limb portion pivot axis A, the body portion axis A' may also be aligned with a natural pivot axis of the user's hip joint.

Also in similar fashion to mechanism 20, a first driven gear may be an internal gear, surrounded by a perimeter, and the body portion pivot axis A' may be located at a lower portion of the perimeter and may be provided in gear housing 33'.

The upper limb portion 3 is thus rotatable relative to the body about an upper limb axis, with the upper limb portion pivotally mounted to the body portion about a body portion pivot axis. The exoskeleton may be configured such that the body portion pivot axis A' is positioned proximate the axis of rotation of the upper limb and the body of a user (e.g., the pivot of the hip joint) and generally below the transfer member axis B'.

It will be appreciated that if a different gear construction is utilized in combination with this aspect, then the relative positioning of the body pivot axis and the joint pivot axis of the exoskeleton may be reversed. For example, the exoskeleton may be configured such that the body portion pivot axis A' of the hip is positioned above the transfer member axis B' Similarly, the exoskeleton may be configured such that the body portion pivot axis A of the knee is positioned below the transfer member axis B.

Foot Plate Assembly

In accordance with another aspect of the teachings described herein, the following is a description of foot plate assembly, which may be used by itself in any exoskeleton or in any combination or sub-combination with any one or more other aspects disclosed herein, including the transmission construction, the offset pivot axis construction and the air bladder strap construction.

According to this aspect, an exoskeleton for the legs of a user is provided with a foot plate that is configured for receiving a foot of the user wherein the foot plate is moveable about the ankle joint of the user so as to facilitate walking. The forward portion of the foot plate may be biased so as to be raised upwardly when the leg of the user is raised off the floor and moved forward. An advantage of this design is that raising of the forward portion of the foot helps to navigate uneven terrain. For example, the foot of a user may not be moved into an object causing the user to fall over. Therefore, this aspect may help to avoid small tripping obstacles that may be found throughout the walking terrain.

Figure 25:
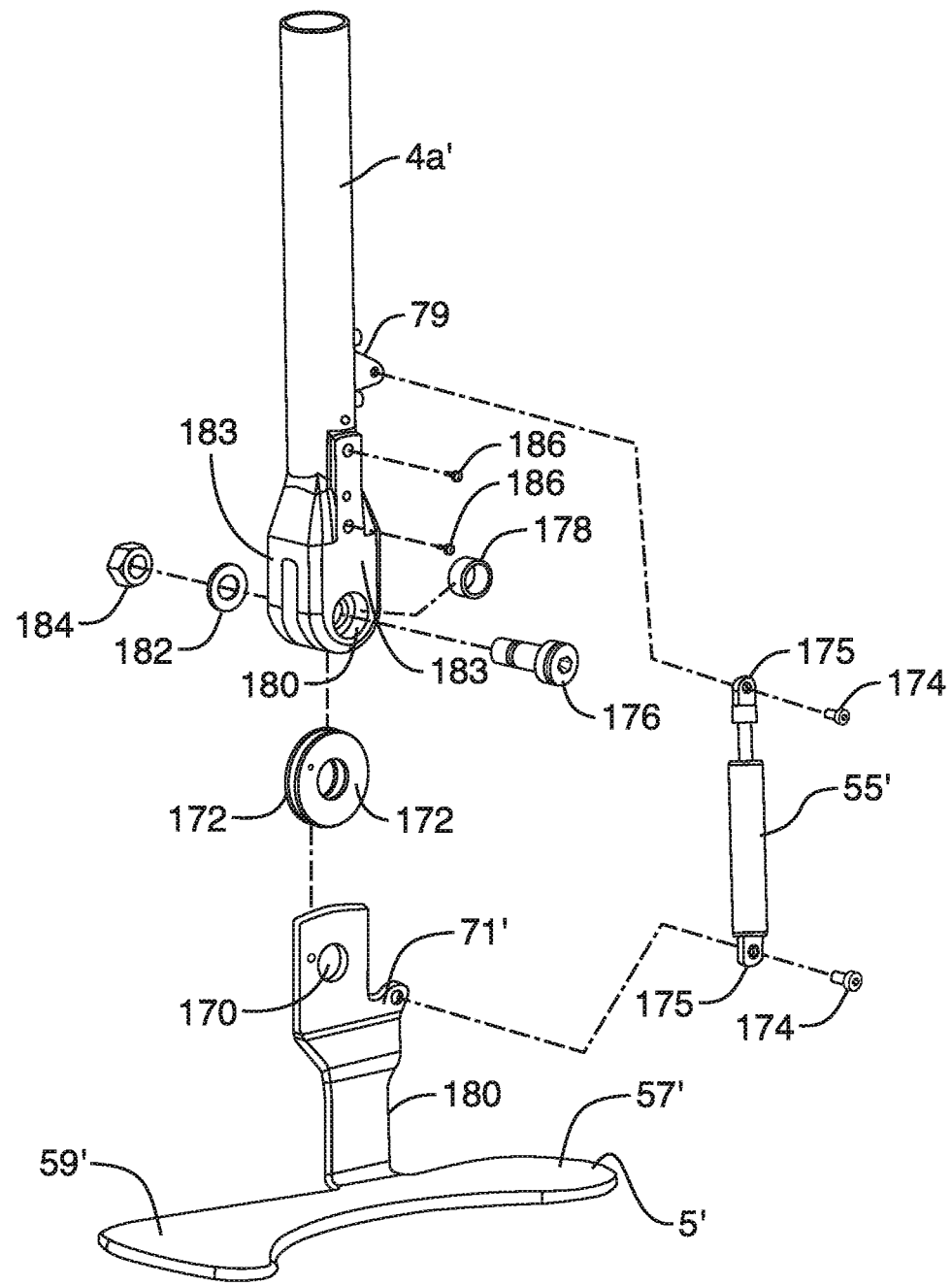
FIG. 25 is an exploded perspective view of the foot portion of FIG. 22.

The foot plate may be biased upwardly by a mechanical biasing member such as a mechanical spring 55 (see FIG. 21) or a pneumatic spring 55" (see FIG. 25). An advantage of the use of a mechanical biasing member is that the biasing member is simpler and less prone to breakdown. Further, it is lighter thereby reducing the weight of the foot plate assembly and reducing the force that is transmitted through the knee joint.

The foot plate may be biased to a raised position by a biasing member that is connected to the leg structure (e.g., lower limb portion 4) and preferably a lower end of lower limb portion 4. It will be appreciated that the biasing member may be biasingly connected to a forward portion of the foot plate assembly 75 and accordingly the biasing member may be biased to a contracted position thereby providing an upwardly directed force to a forward portion of the foot plate assembly 75. Alternately, the biasing member may be biasingly connected to a rearward portion of the foot plate assembly 75 and accordingly the biasing member may be biased to an extended or expanded position thereby providing a downwardly directed force to a rearward portion of the foot plate assembly 75.

The footplate is sized to receive a foot of the user. The foot plate may be sized so as to enable all or most of the foot of the user to be received thereon. Alternately, the foot plate may be sized to underlie only a central portion of the foot of the user. The foot plate may be sized so as to be received in a shoe.

Described herein are embodiments that provide a foot plate biased to an upward position, where the biasing can be achieved without the use of a motor or a geared transmission.

Referring to FIGS. 18-21, a first example of a foot plate assembly 75 is shown wherein an upwardly directed force is provided to a forward portion of the foot plate assembly 75.

Foot plate assembly 75 generally includes a lower leg portion end 4a, which may be a segment or portion of a lower limb portion 4 (more particularly, a lower leg portion), or which may be adapted to be coupled to lower limb portion 4.

In the illustrated example, lower leg portion end 4a is a hollow tube, which is adapted to receive a biasing assembly 54 within the tube. An advantage of this design is that the biasing member is provided as an internal member of the leg structure and therefore a separate protective housing is not required for the biasing member, thereby reducing the weight of the leg structure. In other embodiments, the biasing assembly 54 may be provided external to or adjacent to lower leg portion end 4a (see for example the embodiment of FIG. 22). In some embodiments, a lower leg portion end 4a may not be provided and lower portion 4 may be directly connected to foot plate assembly 75.

Lower leg portion end 4a is moveably coupled to a foot plate 5 at a connection point 52 and is preferably pivotally mounted thereto.

Foot plate 5 may be formed of a single generally U-shaped or stirrup-shaped element, or may be formed from multiple elements coupled together to form the foot plate. Foot plate 5 generally has an underfoot support portion and two flanges 70, with holes 100 therethrough at their upper ends. One of the flanges 70, preferably the outwardly positioned one, is used to connect foot plate 5 to lower leg portion end 4a at connection point 52, which defines an ankle pivot axis C. Pivot axis C is generally transverse to the longitudinal axis of lower leg portion end 4a.

Figure 22:
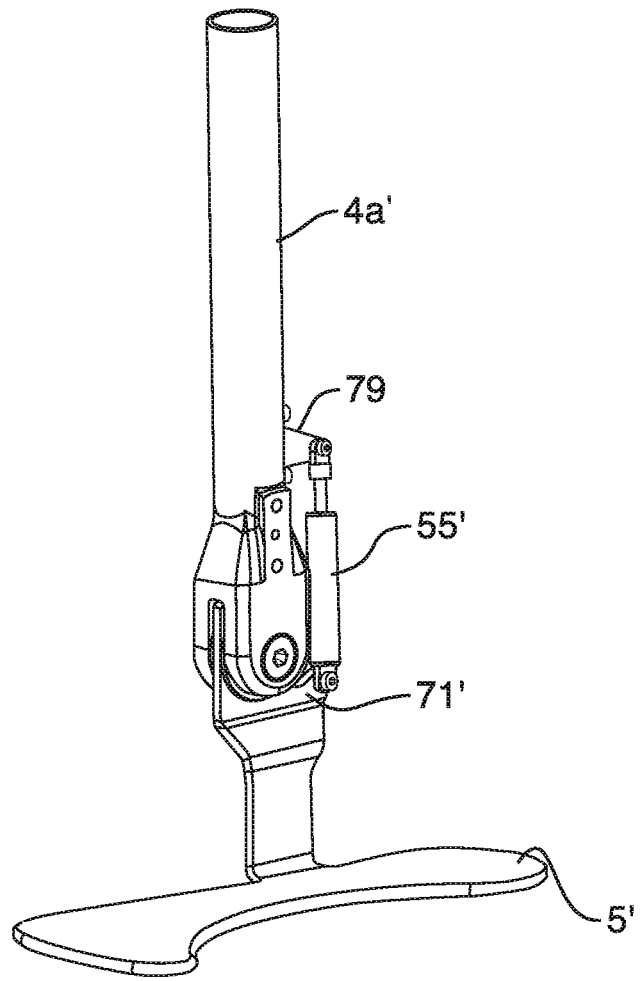
FIG. 22 is a perspective view of a foot portion for the leg of an exoskeleton in accordance with an alternative embodiment.
Figure 23:
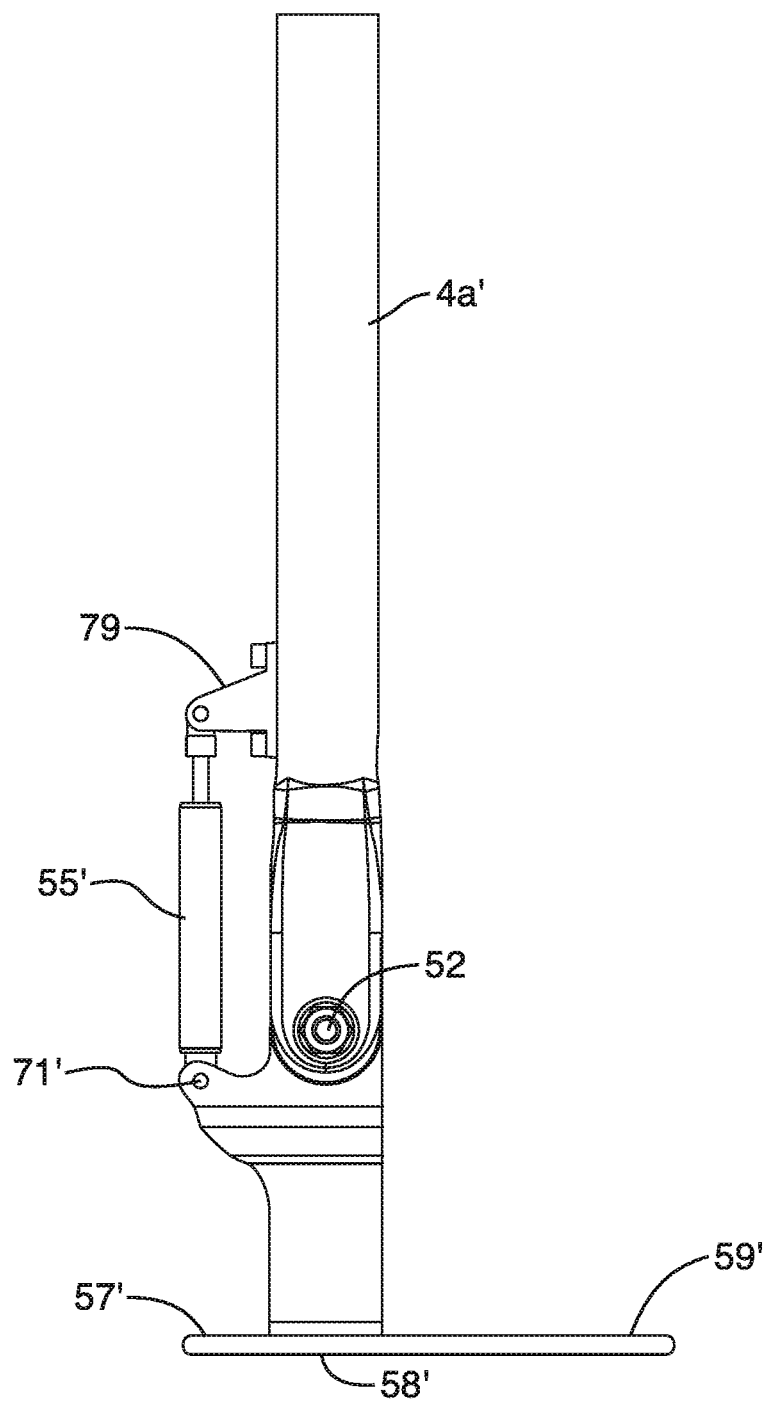
FIG. 23 is an outside side view of the foot portion of FIG. 22.
Figure 24:
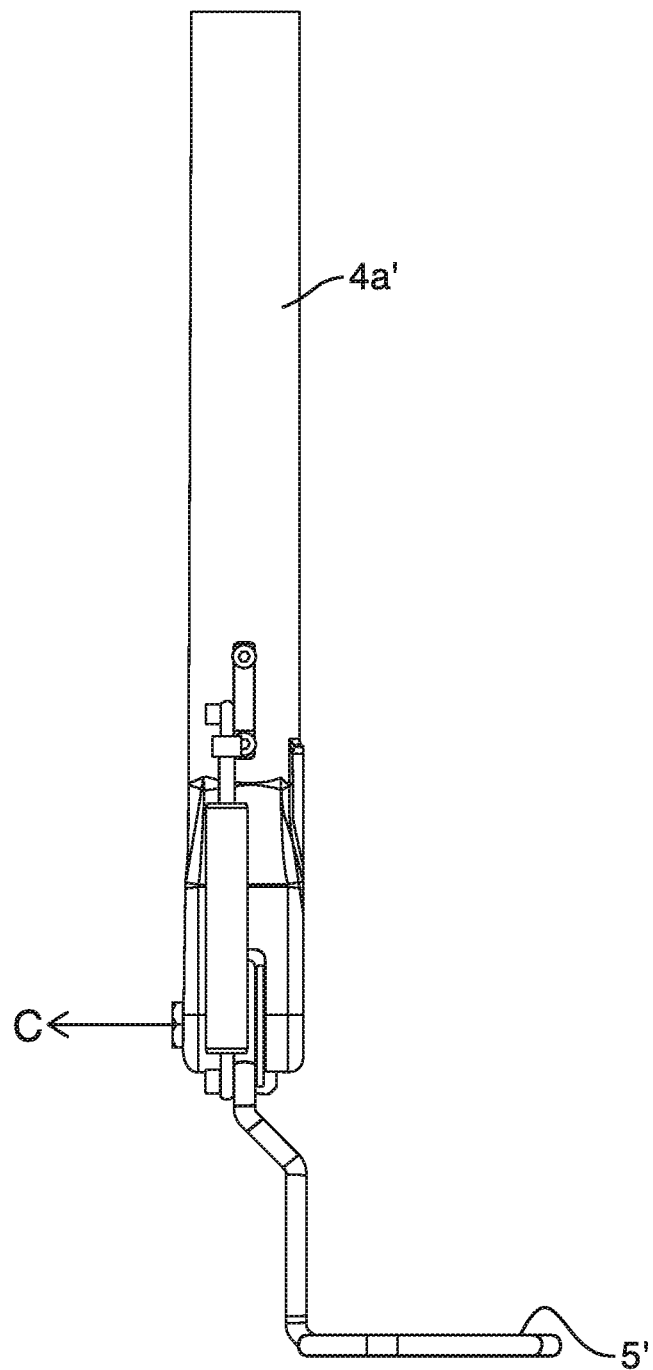
FIG. 24 is a front view of the foot portion of FIG. 22.

Accordingly, it will be appreciated that only one flange 70 may be provided (see for example the embodiment of FIG. 22). Therefore, in some embodiments, only one flange 70 is provided, and may be configured to be positioned to an outer side of a user of the exoskeleton.

Flanges 70 may extend laterally and upwardly from the foot plate underfoot support portion. Flanges 70 are preferably shaped such that opening 100 is positioned adjacent the ankle joint of a user and laterally, and preferably outwardly, spaced therefrom so as to not engage the ankle of a user during walking.

Figure 21:
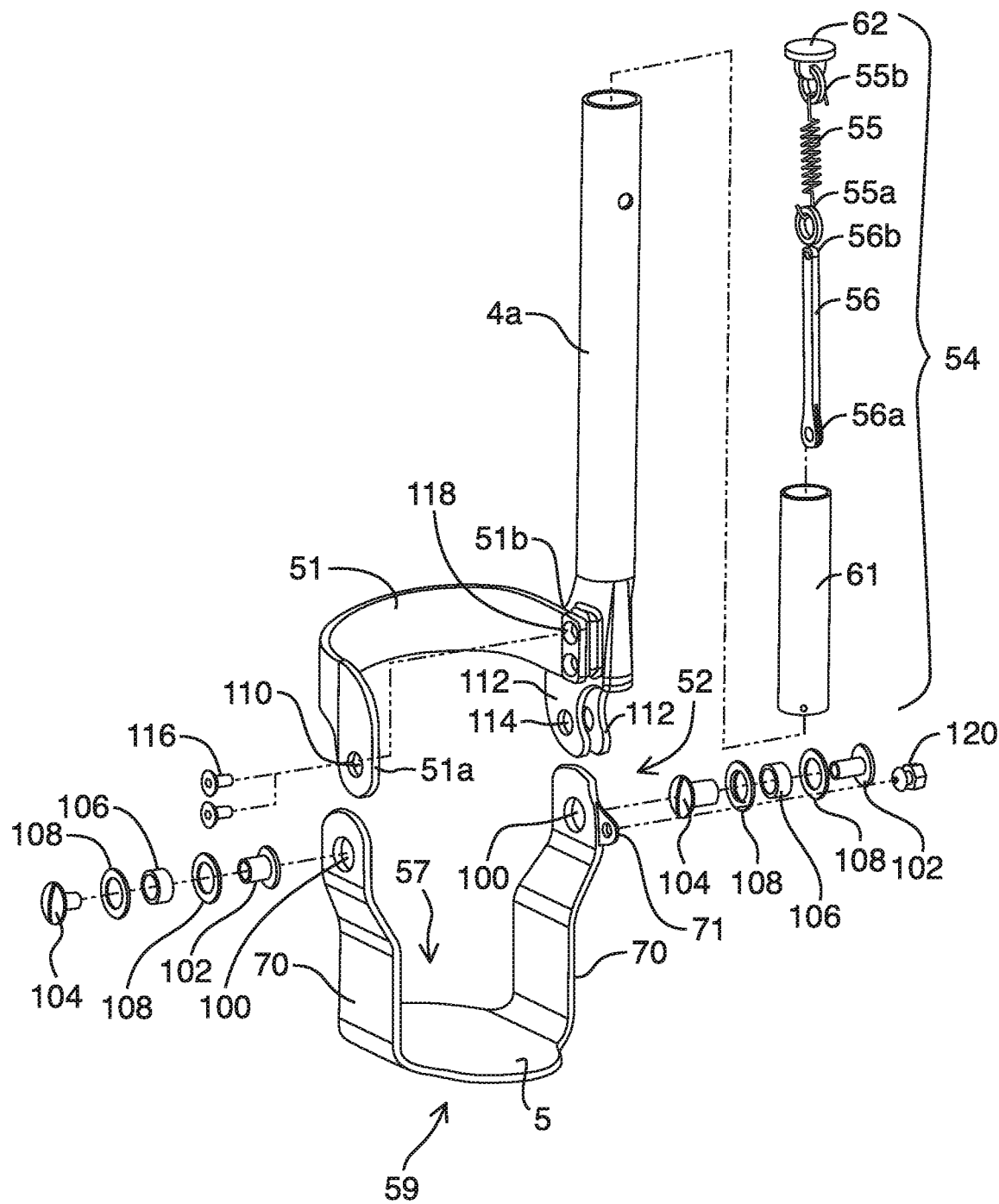
FIG. 21 is an exploded perspective view of the foot portion of FIG. 18.

As exemplified in FIG. 21, lower leg portion end 4a is rotatably moveably coupled to foot plate 5 at the connection point 52 using a suitable bearing, washer assembly or other rotatable coupling. For example, the lower end of lower leg end portion 4a may be provided with a pair of spaced apart flanges 112 and outer flange 70 may be pivotally mounted thereto. As exemplified, flanges 112 have openings 114 therein. Inner flange 70 is received between flanges 112 and openings 114 and 100 aligned. An inner screw member with an internal threaded bore may be provided on an inner side of outer flange 70 and extend outwardly through openings 114 and 100. A washer 108 may be provided between inner screw member 102 and the inner surface of inner flange 70. A bearing 104 may be provided on the shaft of inner screw member 102 and positioned in opening 100. A washer may then be position on the shaft of inner screw member 102 and outer screw member 104, which has an outer threaded shaft, may then be screwed into the threaded bore of inner screw member 102. It will be appreciated that other pivot mounts may be used.

The underfoot support portion of foot plate 5 has a rearward portion 57 provided rearwardly of connection point 52 for supporting the user's heel and a forward portion 59 provided forward of connection point 52 for supporting at least a portion of the user's forefoot. Flange 70 is accordingly provided at middle section 58, between rearward portion 57 and forward portion 59.

Foot plate 5 and the underfoot support portion in particular may be generally sized to fit within a user's shoe, such that in use the user's foot is placed within the flanges 70 and above, e.g., on the top surface of, the underfoot support portion, whereupon the foot plate 5 may be placed within the user's shoe. Accordingly, the user's shoe provides traction for walking.

An ankle support 51 may be provided. In such a case, ankle support 51 may be coupled to lower leg portion end 4a at one end and to foot plate 5 at an opposite end, in which case two flanges 70 may be provided. Alternatively, ankle support 51 may be coupled to foot plate 5 at both ends, for example at connection point 52. Ankle support 51 is generally formed of a stiff material, such as metal or plastic, although flexible materials may also be used in some embodiments and padding may be provided.

As exemplified in FIG. 21, ankle support 51 is provided with an opening 110 at its distal end 51a and may be co-mounted on inner screw member 102 with inner flange 70. It will be appreciated that if an ankle support 51 is not provided, then inner flange 70 may not be provided. The proximal end 51b of ankle support 51 may be secured to lower leg end portion 4a such as by screws 116 that extend through openings 118 in proximal end 51b of ankle support 51 and into lower leg end portion 4a. As such, ankle member 51 is fixed in position. In an alternate embodiment, ankle support 51 may be pivotally or otherwise moveably mounted.

Ankle support 51 may be generally positioned as to be above the heel of the user's shoe, so as not to interfere with the shoe when a walking motion is carried out.

In accordance with the embodiment of FIGS. 18-21, the forward portion 59 of foot plate 5 is biased upwardly. Accordingly, outer flange 70 may include a biasing flange 71, which is provided forward of opening 100 and preferably is provided generally slightly forward of connection point 52 and proximate the ankle of a user of the exoskeleton. Biasing member 55 is biasingly connected between lower limb portion 4 and foot plate assembly 75 and may be directly connected to each or may be connected to a first extension member that extends from biasing member 55 to connect to foot plate assembly 75 and/or a second extension member that extends from biasing member 55 to connect to lower limb portion 4.

As exemplified, first end 55a of biasing member 55 is connected to second end 56b of rod 56 and second end 56a of rod 56 is connected to flange 71 (e.g., via screw 120). Second opposed end 55b of biasing member 55 may be coupled to a cap 62, which can be anchored to a portion of lower leg portion end 4a (e.g., it may seat on the upper opening of lower leg portion end 4a). In some embodiments, cap 62 may be a screw cap coupled to threads provided within lower leg portion end 4a. Adjustment of the screw cap thereby provides tension adjustment of biasing member 55. Optionally, sheath 61 is provided inside lower leg portion end 4a and receives biasing member 55 therein. An advantage of this design is the biasing member, or an extension member, is moveably mounted to the lower leg portion end 4a and the foot plate assembly so that it may pivot or move as a user walks. In view of this construction, the orientation of the biasing member or an extension thereof is moveable with respect to each of the lower limb portion 4 and the foot plate assembly 75. This construction is preferred is the biasing member is a rigid member such as a pneumatic spring as exemplified in FIG. 25. In other embodiments, the orientation may be fixed. Such as embodiment may be used if the biasing member is flexible, such as a coil spring.

It will be appreciated that the biasing member 55 may be secured directly to flange 71 and/or biasing member may be secured to another portion of foot plate assembly 75. Similarly, biasing member 55 may be secured to another portion of the lower leg portion end 4a or lower limb 4.

In the illustrated embodiment, biasing member 55 is a coil spring. However, in other embodiments, biasing member 55 may be an elastic element, a pneumatic spring biased to a compressed position, or other suitable biasing member.

The foot plate is moveably mounted at connection points 52, such that it is articulable between a first position in which the rearward portion 57 extends downwardly and the forward portion 59 extends upwardly, and a second position in which the rearward portion 57 extends upwardly and the forward portion 59 extends downwardly.

Biasing member 55 is generally biased to a compressed configuration, in which foot plate 5 is raised to the first position. By biasing foot plate 5 to the first position, the weight of the user and the exoskeleton causes the foot plate 5 to flatten against a surface when a user places weight on the foot plate 5, such as when in a standing position or when the user is walking and places their foot on the floor. However, when the leg is raised, biasing member 55 causes the foot plate 5 to return to the first raised position, with the forward portion 59 is raised upwardly.

In some embodiments, the biasing member may be pivotally connected to the foot plate at a position other than connection point 52. For example, in some alternative embodiments, the biasing member may be drivingly connected to foot plate 5 at a position rearward of the connection point 52. More particularly, the biasing member may be connected to a flange provided at the middle section that extends laterally and upwardly from the underfoot portion of foot plate 5, or a biasing flange positioned rearwardly of connection point 52. FIGS. 22-25 exemplify such an alternate embodiment.

Referring now to FIGS. 22-25, there is shown another example of a foot plate assembly wherein a downwardly directed force is provided to a rearward portion of the foot plate assembly.

In this alternative configuration, the biasing member 55 is moveable between an extended configuration in which the rearward portion 57 extends downwardly and the forward portion 59 extends upwardly and a contracted configuration in which the rearward portion 57 extends upwardly and the forward portion 59 extends downwardly. In this configuration, the biasing member is biased to the extended configuration. Such a biasing member 55' may be a telescoping pneumatic spring, for example.

The telescoping spring may be moveably, and preferably, pivotally mounted to the lower leg portion end 4a, such as by a flange 79. In this embodiment, flange 71' is provided rearward of the connection point 52 and telescoping spring may be moveably, and preferably, pivotally mounted to flange 71'. In some embodiments, biasing member 55' may be a pneumatic cylinder.

Biasing member 55' has support mounts 175 at opposite ends. Screw members 174 may be used to secure support mounts 175 to flange 79 and flange 71', respectively.

Foot plate 5' may be formed of a single generally U-shaped or stirrup-shaped element, or may be formed from multiple elements coupled together to form the foot plate. Foot plate 5' generally has an underfoot support portion and one outboard flange 180, with a hole 170 therethrough at its upper end for connection point 52. Flange 180 extends laterally and upwardly from the foot plate underfoot support portion. Flange 180 is preferably shaped such that opening 170 is positioned adjacent the ankle joint of a user and laterally and, preferably outwardly, spaced therefrom so as to not engage the ankle of a user during walking.

As exemplified in FIG. 25, lower leg portion end 4a' is rotatably moveably coupled to foot plate 5' at the connection point 52 using a suitable bearing, washer assembly or other rotatable coupling. For example, a lower end of lower leg 4a' may be provided with forks 183, which have an opening 180 therethrough. Forks 183 may be secured to the lower leg 4a' by means of fasteners 186, although in other embodiments, forks 183 may be integral to lower leg 4a'.

Opening 180 is aligned with opening 170 and forks 183 are spaced apart from flange 180 by a pair of washers 172. An inner screw member 176 with an outer threaded shaft may be provided on an inner side of inner flange 70 and extend outwardly through opening 180. A bearing 178 may be provided on the shaft of inner screw member 176 and positioned in opening 180. A washer 182 may then be positioned on the shaft of inner screw member 176 and an outer screw member 184, which has an inner threaded shaft, may then be screwed into the threaded bore of inner screw member 176. It will be appreciated that other pivot mounts may be used.

In some embodiments, the biasing member may be moveably mounted to the foot plate 5 at a position proximate the ankle of the user and may be positioned offset from the ankle above or below the ankle, and forward or rearward of the ankle.

Air Bladder Straps

In accordance with another aspect of the teachings described herein, the following is a description of a strap which may be used by itself in an exoskeleton or in any combination or sub-combination with any one or more other aspects, including the transmission construction, the offset pivot axis construction and the foot plate assembly construction.

In order to support the weight of a user while in use, the exoskeleton should be secured to the user at various points. For example, the exoskeleton may be secured to the user at the waist, mid-thigh level, and mid-calf level. In another example, the exoskeleton can be secured at the waist, at an upper thigh level proximate to the hip, at a lower thigh level proximate to the knee, at a sub-patellar level proximate to and below the knee, and at an ankle level.

In some embodiments, plastic or fabric straps may be used to secure the exoskeleton to the user. However, such straps may apply pressure to the user's limbs and torso at certain points, causing pain or discomfort, or even bruising and abrasion injuries if the user has impaired feeling in the limb. Moreover, straps that are poorly fitted may have a tendency to "ride" up or down a limb which may impact performance of the exoskeleton and even pose a risk to the user. Further, the movement of the strap relative to the user may cause damage to the skin of the user.

In accordance with this aspect, a strap is provided which has an air bladder or pocket therein. The air bladder is inflated to a pressure within a desired range. The pressure is set so as to be sufficient to secure a user in position. The upper level of the preferred pressure range may be set so as to be below a level at which the circulation of the user is restricted. The lower level of the preferred pressure range may be set so as to be above a level at which the strap is too lose and will move while in use.

An advantage of the use of straps that include one or more air bladders is that the tendency for pressure sores to occur may be reduced. Pressure sores occur from over compression of the skin. A user may not have any sensation at the location at which a strap is used to secure them to an exoskeleton. Therefore, when a strap is applied, it may be applied at a compression that is acceptable while at rest but which produces over compression during walking. For example, a paraplegic does not have any sensation below the point of injury and will not feel when a strap is too tight and is over compressing the skin. Pressure sores are a significant reason for the rehospitalization of paraplegics.

Referring to FIGS. 26-29, examples of straps are shown for use with an exoskeleton, such as exoskeleton 1. As described herein, exoskeleton 1 may have at least one leg structure, and a drive member such as a drive motor 21, operatively connected to the at least one leg structure.

One or more air bladder straps 81 may be attached or coupled to the exoskeleton and configured to secure a user to a portion of the exoskeleton.

Figure 26:
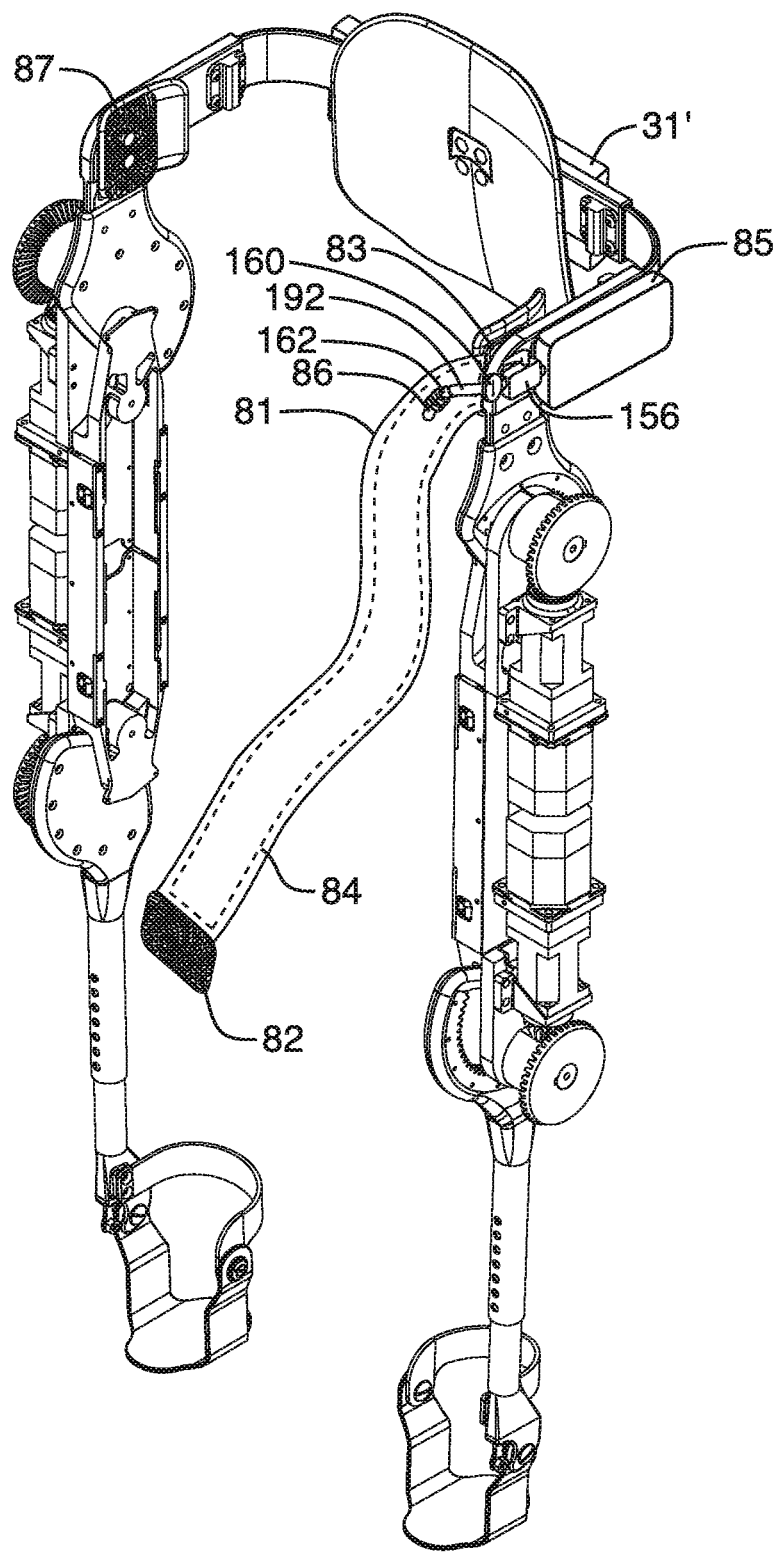
FIG. 26 is a perspective view of an exoskeleton with an example air bladder strap.

In the example of FIG. 26, air bladder strap 81 has a section that extends from an openable portion 82 to an attachment portion 83 provided on the exoskeleton, the section having an inflatable pocket 84 having a first end proximate the openable portion and a second end proximate the attachment portion. The first and second ends are in air flow communication. An advantage of this design is that essentially the entire length of the strap that surrounds a portion of the user may have an air bladder that permits air to flow from one end to the other. Therefore, the pressure in the entire air bladder will remain uniform. Accordingly, if the strap is compressed at one location during use of the exoskeleton, the local pressure in the air bladder at that location will increase but be dissipated throughout the air bladder, thereby reducing the compression applied to the body of the user.

A power pack or battery 31' is also shown in FIG. 26, mounted on a waist member or body portion of the exoskeleton. It will be appreciated that battery 31' can be provided instead of batteries 31 mounted on the upper leg portions, or may be provided in addition to such batteries. It will be further appreciated that battery 31' may be mounted in a variety of positions, for example on a back portion of the waist member, along the sides, or combinations thereof.

Figure 27:
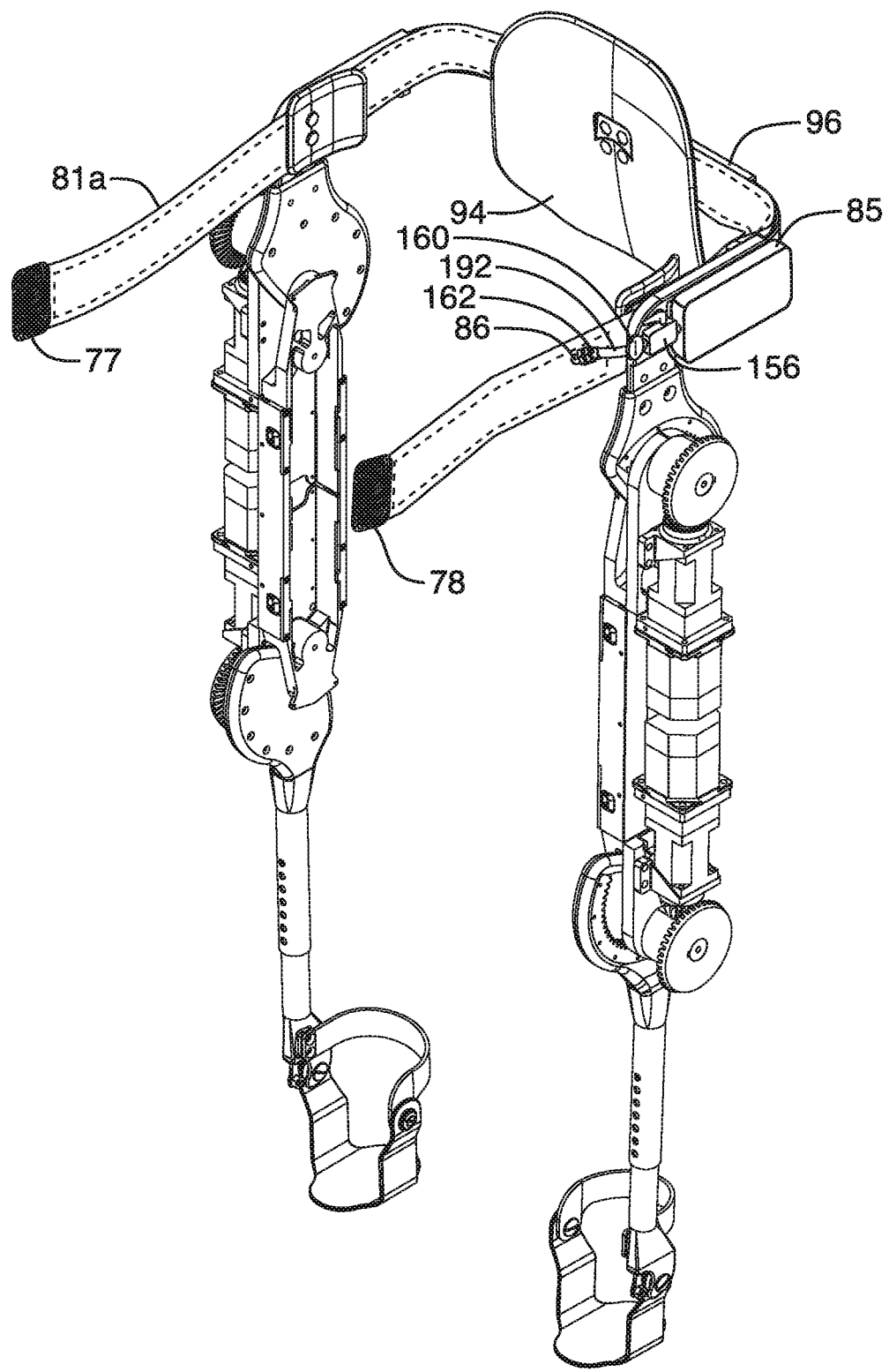
FIG. 27 is a perspective view of an exoskeleton with another example air bladder strap.

In another example shown in FIG. 27, air bladder strap 81a extends continuously around the user's body, passing behind back support 94 but between back support 94 and back adjustment 96. An openable portion 77 of air bladder strap is releasably attachable to an attachment portion 78.

It will be appreciated that, in some embodiment, a single continuous air bladder or inflatable pocket 84 may not extend from a position proximate openable portion 82 to a position proximate attachment portion 83. Further, in other cases, an air bladder may extend only along a portion of a strap. In such an embodiment, the strap may include 2 or more air bladders that are positioned end to end so as to extends part or all of the way from a position proximate openable portion 82 to a position proximate attachment portion 83.

In some embodiments, the inflatable pocket 84 is integral to the air bladder strap, for example where the air bladder strap is formed of plastic elements heat sealed to form the inflatable pocket. Accordingly, an outer cover member that is secured to the exoskeleton may not be used.

In other embodiments, the inflatable pocket 84 may be a bladder inserted in a strap, wherein the strap is formed from two or more sections. For example, the strap may be formed from two or more lengths of fabric sewn together, and a bladder inserted between the fabric pieces.

A source of pressurized fluid, such as an air compressor 85 or compressed air cylinder is connectable in flow communication with the inflatable pocket via an inlet 86. The source of pressurized fluid may be on board the exoskeleton or external, and preferably on body portion 9.

Referring again to FIG. 26, openable portion 82 of the air bladder strap may be releasably attachable to the exoskeleton at a first location on the exoskeleton, such as attachment point 87. Any attachment suitable for securing the exoskeleton to the user may be used, including for example a buckle, a snap connector, or hook-and-loop fastener or the like.

In some embodiments, the air bladder strap is non-releasably attached to the attachment portion 83 provided on the exoskeleton. For example, the air bladder strap may be fastened to the attachment portion 83 using screws, adhesives or the like.

Figure 28:
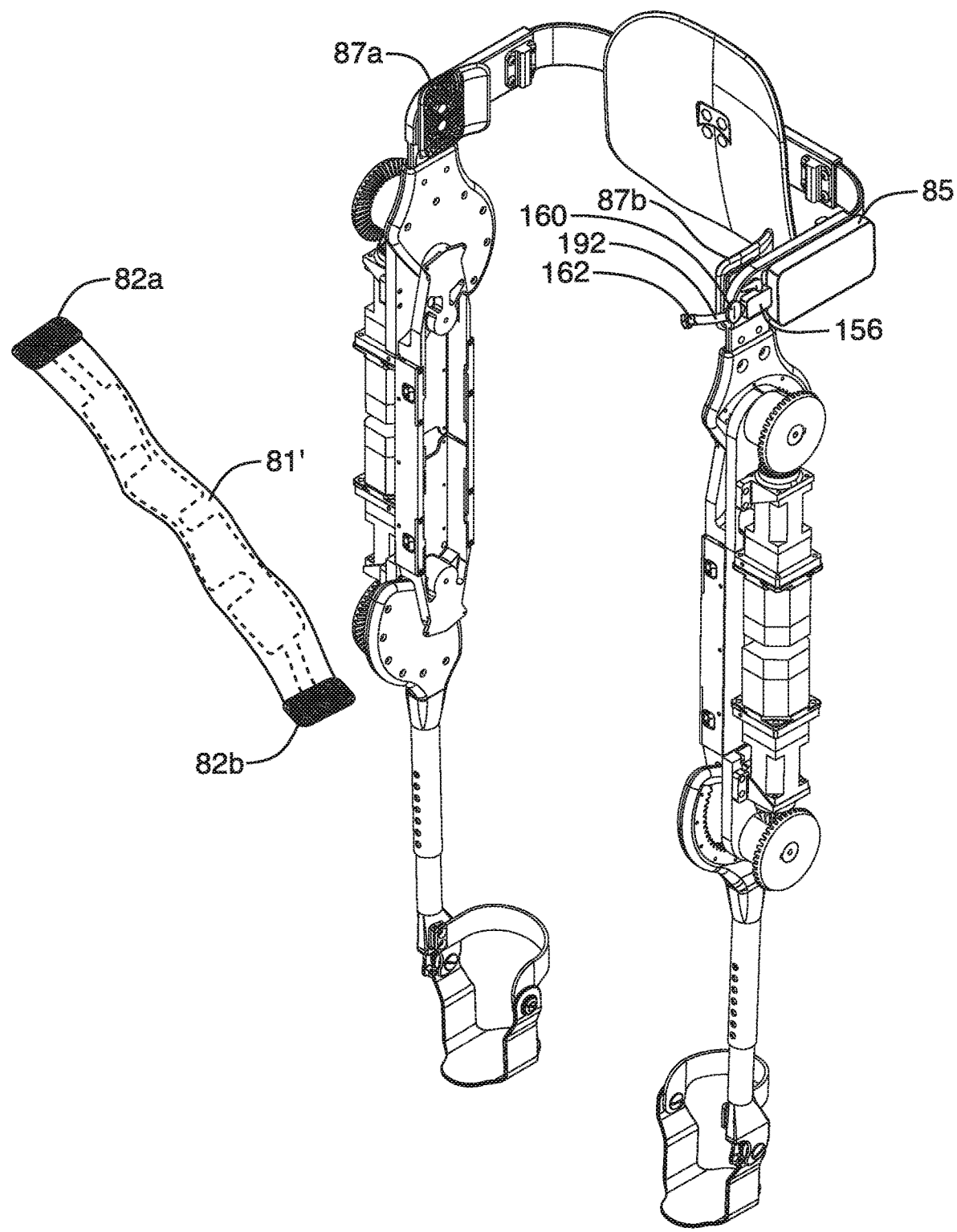
FIG. 28 is a perspective view of an exoskeleton with yet another example air bladder strap.

In other embodiments, such as that shown in FIG. 28, the air bladder strap 81' is releasably attached to a first location 82a and a second location 82b. In such embodiments, a fluid flow coupling may be provided at the first or second location, or both, to provide fluid communication between the source of pressurized fluid and the inflatable pocket.

Figure 29:
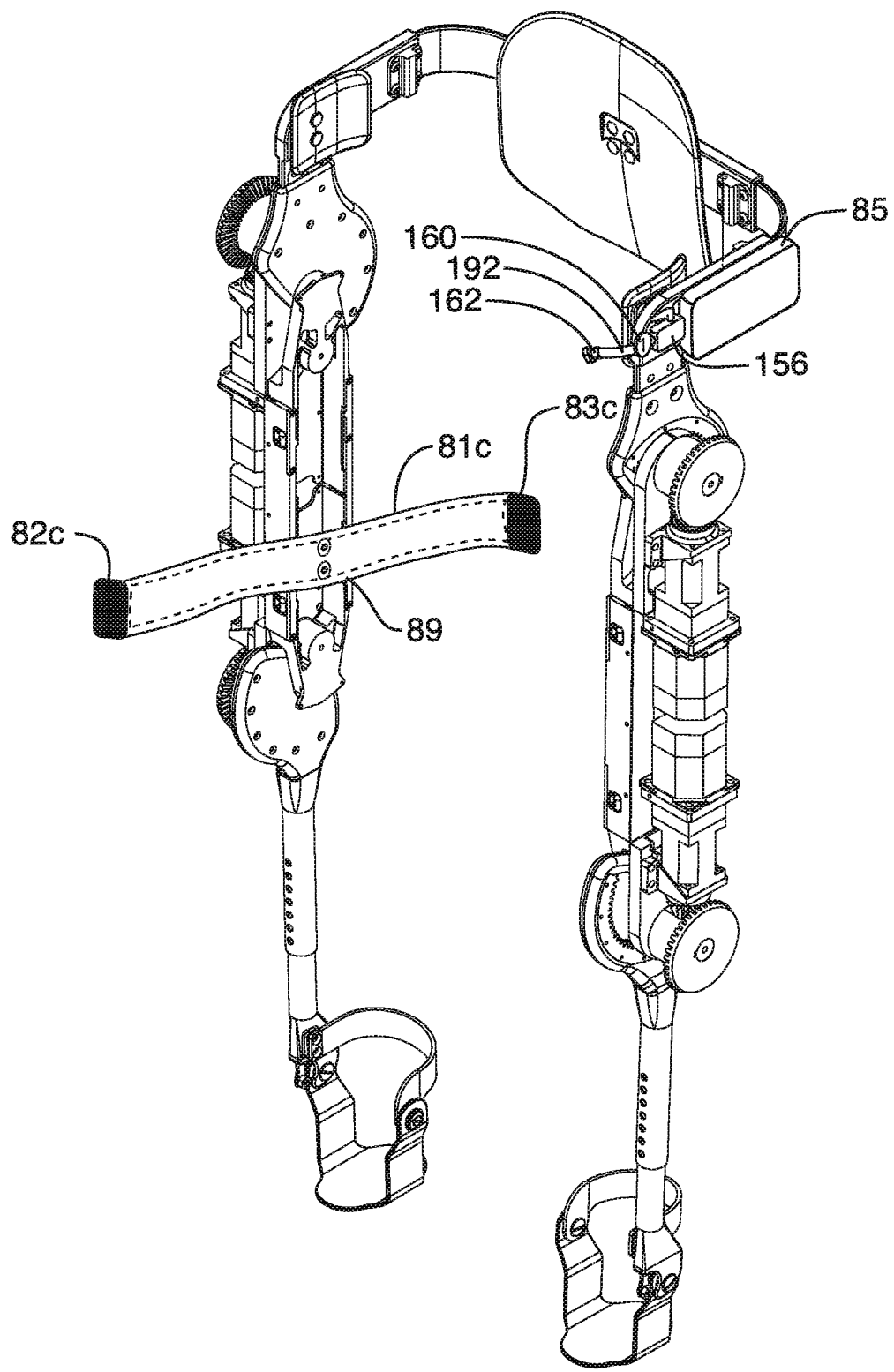
FIG. 29 is a perspective view of an exoskeleton with yet another example air bladder strap.

In still other embodiments, such as that shown in FIG. 29, the air bladder strap 81c may be connected to the exoskeleton at a mid-portion 89 of the strap, and an openable portion 82c may be releasably attachable to an attachment portion 83c provided on an opposing end of the strap, such as by a snap connector, or hook-and-loop fastener or the like.

In some embodiments, the inflatable pocket may be baffled, as shown in FIG. 28. In such a case, the laterally opposed ends of the strap are still in air flow communication with each other.

In some embodiments, the air bladder strap may have at least one additional inflatable pocket. For example, strap 81 may be provided with a second pocket 84 that is parallel to and may be coextensive with (e.g., above or below) pocket 84. The source of pressurized fluid may be in flow communication with all of the inflatable pockets or different sources of pressurized fluid may be provided and one source of pressurized fluid may be in flow communication with only one or more of the inflatable pockets.

It will be appreciated by a skilled person in the art that various combinations and configurations of the air bladder strap are possible, and more than one configuration may be used with a single exoskeleton.

In use, the air bladder strap is generally extended around a portion of the user's body and connected to the exoskeleton. The air bladder strap is then pressurized or inflated to a predetermined pressure from a source of pressurized fluid, under the control of a controller (see FIG. 30) which may be provided on the exoskeleton, preferably on body portion 9, or which may be an external controller. The controller is generally operatively connected to the source of pressurized fluid.

The controller may be configured to maintain pressure in the air bladder strap within a predetermined range. Alternately, the controller may be configured to maintain pressure in the air bladder strap above a predetermined level. The source of pressurized fluid may be in air flow communication with each strap 81. Alternately, a separate source of pressurized fluid may be in air flow communication with each strap 81.

Figure 30:
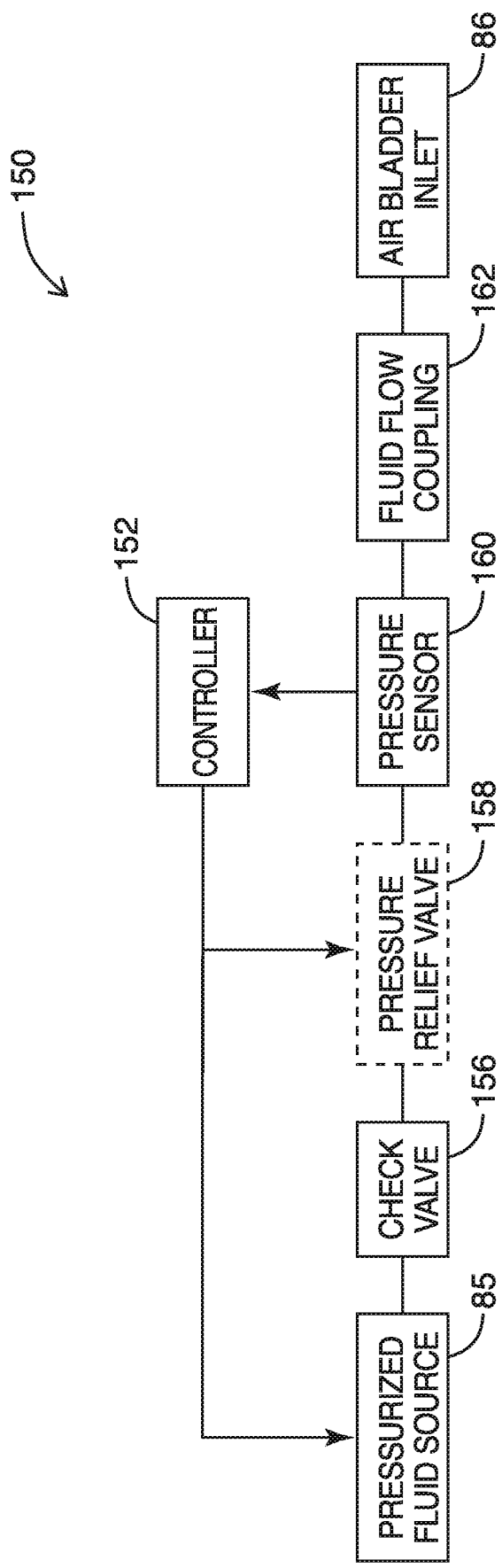
FIG. 30 is a schematic drawing of a control system for an exoskeleton with an air bladder strap.

Referring to FIG. 30, there is shown an example control system 150 for monitoring pressure in the air bladder strap using a pressure sensor 160 in flow communication with the inflatable pocket 84. A controller 152 monitors pressure in pocket 84 using pressure sensor 160. Pressure sensor may be provided between a source of pressurized fluid 85 and the pocket 84, and preferably between the source of pressurized fluid 85 and a fluid flow coupling 162 (e.g., the inlet to pocket 84). For example, it may be in the flow conduit 192 between the source of pressurized fluid 85 and the pocket 84. Controller 152 may be configured to actuate the source of pressurized fluid 85 in response to a low pressure signal from the pressure sensor 160.

The fluid flow coupling 162 is generally provided at an air bladder inlet 86. A check valve 156 may also be positioned between the pressure sensor 160 and the source of pressurized fluid 85 to isolate the source of pressurized fluid 85 when it is not in use.

In some embodiments, a pressure relief valve 158 may be provided in flow communication with the inflatable pocket. Pressure relief valve is configured to release pressure from the air bladder strap when an overpressure condition occurs. Pressure relief valve 158 may be a mechanical valve (e.g., spring actuated) in which case the controller may be configured to maintain pressure in the air bladder strap above a predetermined level. Alternately pressure relief valve 158 may be electronic (e.g., it may be actuatable by the controller 152 to automatically release pressure from the air bladder strap when the pressure in the inflatable pocket exceeds a predetermined pressure, such as determined by pressure sensor 1600), in which case the controller may be configured to maintain pressure in the air bladder strap within a predetermined range.

In some embodiments, the pressure relief valve 158 and the check valve 156 may be a single three way valve.

Accordingly, the controller 152 may be configured to maintain the fluid pressure within inflatable pocket 84 at a predetermined pressure, or within a predetermined range. The predetermined pressure can be selected to provide a secure fit of the exoskeleton to the user while preventing injury or discomfort to the user.

In some embodiments, as exemplified in FIG. 26, body portion 9 has the power supply, the source of compressed air 85 and controller mounted thereon. An advantage of this design is that the weight of these components is provided on the part of the exoskeleton that is secured to a user's waist. Therefore, this portion of the weight is transmitted to the user's lower torso. This reduces the weight that would otherwise be placed on the limbs of the exoskeleton, which would increase the force transmitted through the joints of the exoskeleton.

Control System

The control system may, in addition to controlling operation of the air bladder straps, also control movement of the exoskeleton. In particular, the control system may include one or more modules for monitoring various sensors provided on the exoskeleton, and controlling motors to cause movement of the exoskeleton.

Embodiments of the control system described herein may be implemented in hardware or software, or a combination of both. These embodiments may be implemented in computer programs executing on programmable computers, each computer including at least one processor, a data storage system (including volatile memory or non-volatile memory or other data storage elements or a combination thereof), and at least one communication interface.

Each program may be implemented in a high level procedural or object oriented programming or scripting language, or both. However, alternatively the programs may be implemented in assembly or machine language, if desired. The language may be a compiled or interpreted language. Each such computer program may be stored on a non-transitory computer-readable storage medium (e.g., read-only memory, magnetic disk, optical disc). The storage medium so configured causes a computer to operate in a specific and predefined manner to perform the functions described herein.

As the term module is used in the description of the various embodiments, a module includes a functional block that is implemented in hardware or software, or both, that performs one or more functions such as the processing of an input signal to produce an output signal. As used herein, a module may contain sub-modules that themselves are modules.

Figure 31:
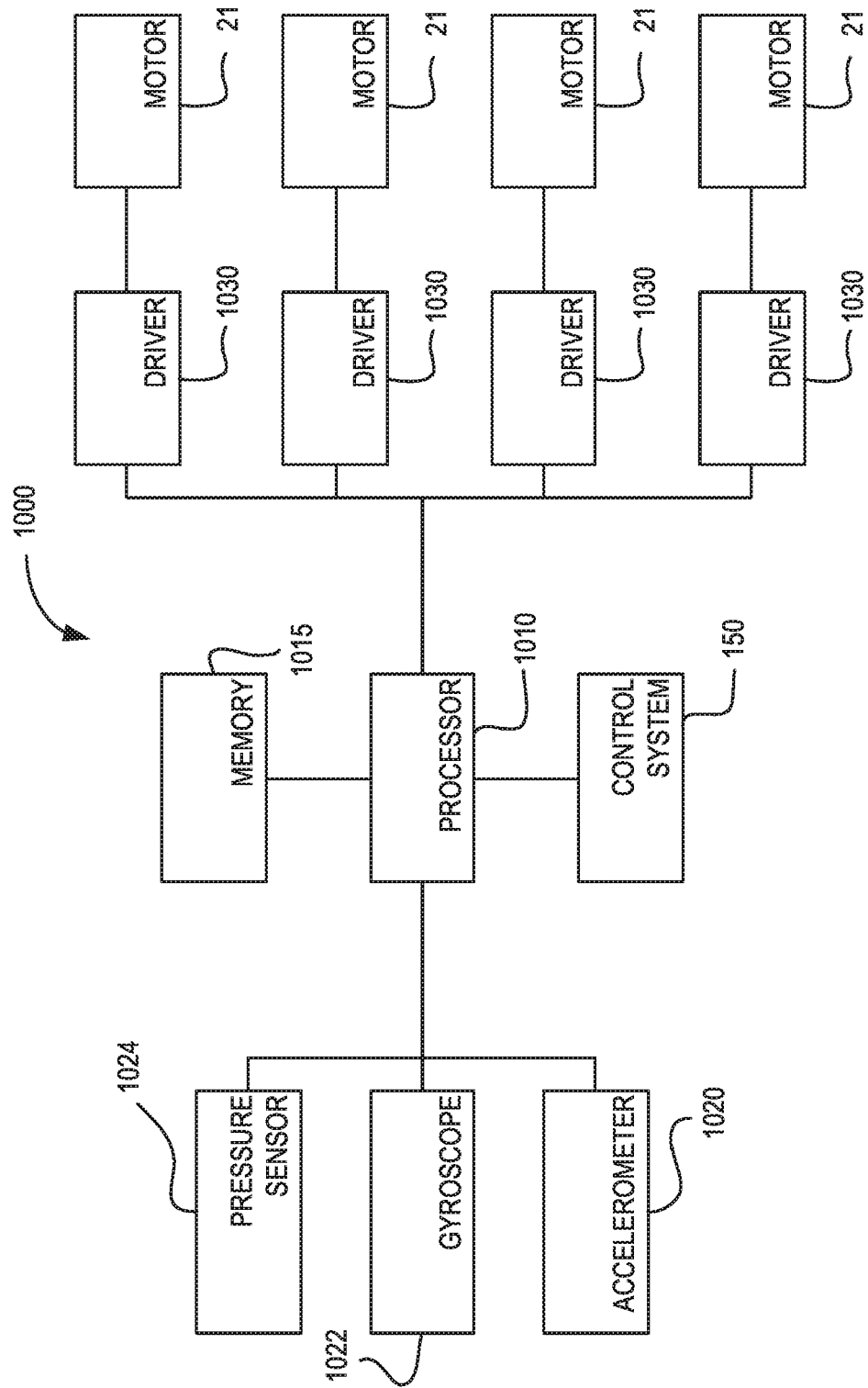
FIG. 31 is a schematic drawing of a control system for an exoskeleton.

Referring now to FIG. 31, there is shown a schematic of an example control system 1000 for an exoskeleton apparatus, such as exoskeleton 1, for example.

Control system 1010 includes a processor 1010, a memory 1015, one or more batteries, a plurality of sensors and a plurality of motor driver modules. Control system 1000 may also incorporate control system 150.

The plurality of sensors, which are physically coupled to the exoskeleton, are operatively coupled to processor 1010.

Some of the sensors may be configured to detect a physiological characteristic associated with the exoskeleton. The physiological characteristic can be a positional characteristic used in inertial navigation. One example of a sensor capable of measuring a positional characteristic is an accelerometer 1020, which is capable of measuring acceleration (e.g., due to gravity). Another example of a sensor capable of measuring a positional characteristic is a gyroscope 1022, which is capable of measuring roll, yaw and pitch relative to a calibrated reference position.

In some embodiments, the physiological characteristic can be a force exerted upon the exoskeleton by some other object (e.g., a chair, a floor, etc.). Accordingly, a force sensor 1024 (or pressure sensor) may also be provided to measure the applied force. The force sensors facilitate safe operation of the exoskeleton, by measuring which portions of the exoskeleton are in contact with a surface (e.g., floor) at any given moment. By placing force sensors in the foot plate portion, the positional characteristics measured by positional sensors can be coordinated with force characteristics to identify the current state of the exoskeleton.

Although only three sensors are explicitly shown in FIG. 31 so as not to obscure the control system 1000, it will be appreciated that more than one of each type of sensor may be provided and used.

For example, force sensors 1024 may be placed on an underside of each foot plate 5, or atop the foot plate in contact with the user's foot. Accelerometers 1020 and gyroscopes 1022 may be provided on each limb portion 3 and 4, on a back support of the exoskeleton (e.g., to detect when the user leans forward, backward or sideways), and the like.

Memory 1015 may include both volatile and non-volatile memory, and may be used to store a database and control system software. The control system software may be executed by processor 1010.

Processor 1010 may be a microcontroller, an embedded processor, a field programmable gate array (FPGA) or other suitable microprocessor. In operation, processor 1010 receives input signals from the plurality of sensors to generate an input profile at a particular moment in time. The input profile can be mapped to a selected profile in a preconfigured plurality of movement profiles, as described herein. Each of the movement profiles has one or more corresponding control actions, which processor 1010 implements via one or more motor driver modules 1030 when the current input profile matches one of the movement profiles.

In general, processor 1010 is capable of monitoring the plurality of sensors and implementing control actions in real-time. As the exoskeleton operates with battery power, processor 1010 can be chosen to have low power consumption.

Processor 1010 is operatively coupled to motor driver modules 1030, which control the operation of drive motors 21. In some embodiments, motor drive module 1030 includes an integrated circuit driver. One motor driver module 1030 may control multiple drive motors 21. However, in practice this arrangement may cause a high amount of power usage for a single integrated circuit, risking "burning out" the circuit. Accordingly, a separate motor driver module 1030 may be provided for each drive motor 21. In general, each drive motor 21 drives the operation of a joint of the exoskeleton (e.g., knee or hip), and therefore each motor driver module 1030 can control the movement of the joint, under the direction of processor 1010.

In one example embodiment, exoskeleton 1 has four drive motors 21. Each motor is a 48V motor drawing approximately 1 A while in use. Motor driver modules 1030 have a current capacity of approximately 25 A. Control system 1000, and processor 1010, operates at 5V. The battery has cell voltages of approximately 3.7V and a combined capacity of about 20 Ah, requiring approximately 15 battery cells. Given this configuration, exoskeleton 1 has a run-time of approximately 4 hours with a 100% duty cycle.

Figure 32:
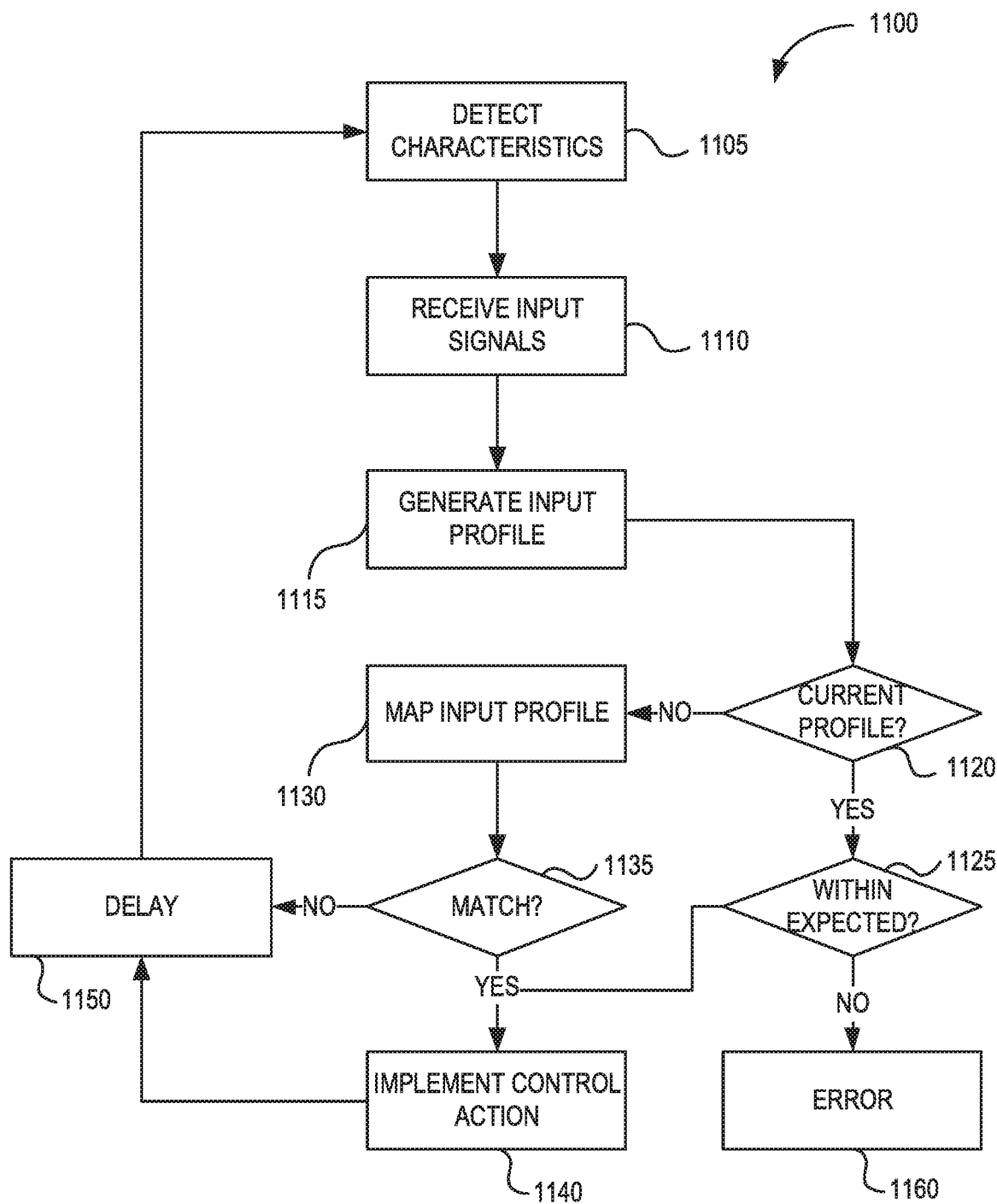
FIG. 32 is a flow diagram of a method of operating the control system of FIG. 31.

Referring now to FIG. 32, there is shown a flow diagram of an example method of controlling an exoskeleton. Method 1100 may be carried out, for example, by processor 1010 of control system 1000.

Method 1100 may be initiated by a user placing the control system 1000 and exoskeleton in an active mode. For example, the active mode may be enabled by the user activating a patient input interface such as a switch or button (not shown) provided on the exoskeleton.

At 1105, the control system detects physiological characteristics associated with the exoskeleton, using the plurality of sensors coupled to the exoskeleton. Each sensor performs a measurement (e.g., force, acceleration, etc.) and generates a data signal containing a representation of the respective measurement.

The data signal generated by each sensor is input to processor 1010 as input signals at 1110, and processor 1010 collects the input signals to generate an input profile for the current set of input signals at 1115.

At 1120, processor 1010 determines if there is a currently selected movement profile. If there is no currently selected movement profile, processor 1010 continues to 1130. If there is a currently selected movement profile identified in a previous pass through method 1100, processor 1010 determines if sensor values are still within the expected values for the selected movement profile and, if they are, continues implementing the associated control action at 1140. If the sensor values are no longer within the expected values, then processor 1010 may implement an error recovery action at 1160. For example, the error recovery action may be to cease operating drive motors until a known state is achieved again.

At 1130, processor 1010 attempts to map the input profile to a selected profile from a plurality of movement profiles stored in a memory. The movement profiles can be pre-configured, for example, by recording the movement of an able-bodied individual while wearing the exoskeleton. There may be movement profiles for any number of discrete movements. Examples of movement profiles include profiles for the "sitting-to-standing" motion, "standing-to-walking" motion, "walking-to-stopping" motion, and "standing-to-sitting" motion. A movement profile may also be pre-configured for an initialization or foundation state, which can be used during power-on or activation of the exoskeleton. For example, the initialization state may be a "sitting" state.

Each movement profile may have one or more corresponding control action, which is based on one or more expected values from at least two of the sensors. For example, one control action may be to operate a drive motor in a knee joint throughout the "sitting-to-standing" motion. The expected values for this control action may correlate to an initial horizontal position of both upper leg limb portions (e.g., parallel to the floor) and an initial vertical position of both lower leg limb portions. If the sensor values are not within expected values, this may indicate that one or more limb portions is not in the anticipated position and that it may not be safe to carry out the control action. Accordingly, the control action may not be carried out.

Generally, each movement profile corresponds to a "scenario" that governs how the exoskeleton should behave based on sensor inputs. Further description of the movement profiles is provided herein below.

At 1135, processor 1010 determines if the current input profile matches any movement profiles. For a match to occur, the sensor values for each sensor input identified in the selected movement profile must be within the range of expected values specified in the selected movement profile. However, not all sensors need be considered in every movement profile.

If the input profile matches the selected movement profile, one or more control actions may be implemented at 1140, as described herein, to carry out a movement of the exoskeleton.

If no match is found, a delay may be implemented at 1150, before re-initiating method 1100. The delay may be minimal, for example on the order of milliseconds, such that method 1100 executes during a sampling interval of the plurality of sensors, or during some number of clock cycles of processor 1010.

Likewise, if a match was found and a control action is being implemented at 1140, a delay may be implemented at 1150, before re-initiating method 1100.

Figure 33:
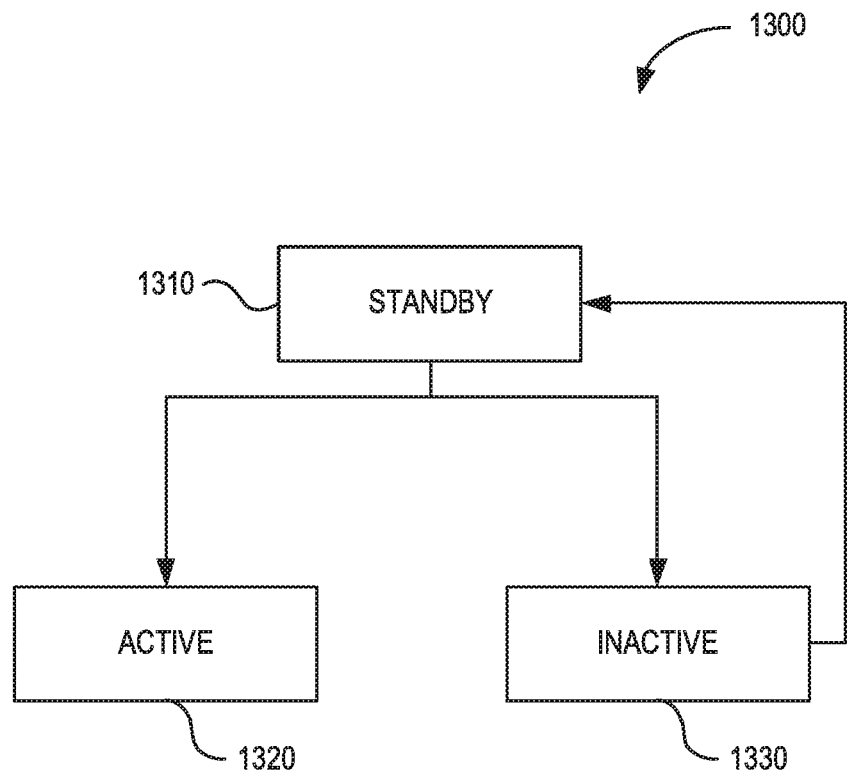
FIG. 33 is a flow diagram of an initialization movement profile.

Referring now to FIG. 33, there is shown an example flow diagram 1300 for an initialization movement profile. In the example initialization movement profile, control system 1000 monitors an engage switch, which can be operated by the user. The flow 1300 begins at 1310 in a standby state and determines whether input signals from the switch indicate that the active mode is to be engaged in response to actuation of a switch at 1320. If the switch has not been actuated when polled at 1330, the system returns to the standby state at 1310.

The initialization movement profile may be used when the user first dons the exoskeleton. For example, the user may position his or her body onto the exoskeleton and affix straps to secure the exoskeleton to the body. The exoskeleton may be initially positioned on a chair, such that once the user has secured the exoskeleton to the body, the user is also sitting in the chair. This initial sitting position may be classified as the initialization movement profile. The user may press an engage button to place the exoskeleton into an active mode, whereupon the exoskeleton can verify input signals from sensors that indicate the exoskeleton is now in a "sitting" movement profile. Optionally, pressing of the engage button may transition directly into the "sitting-to-standing" movement profile.

Figure 34:
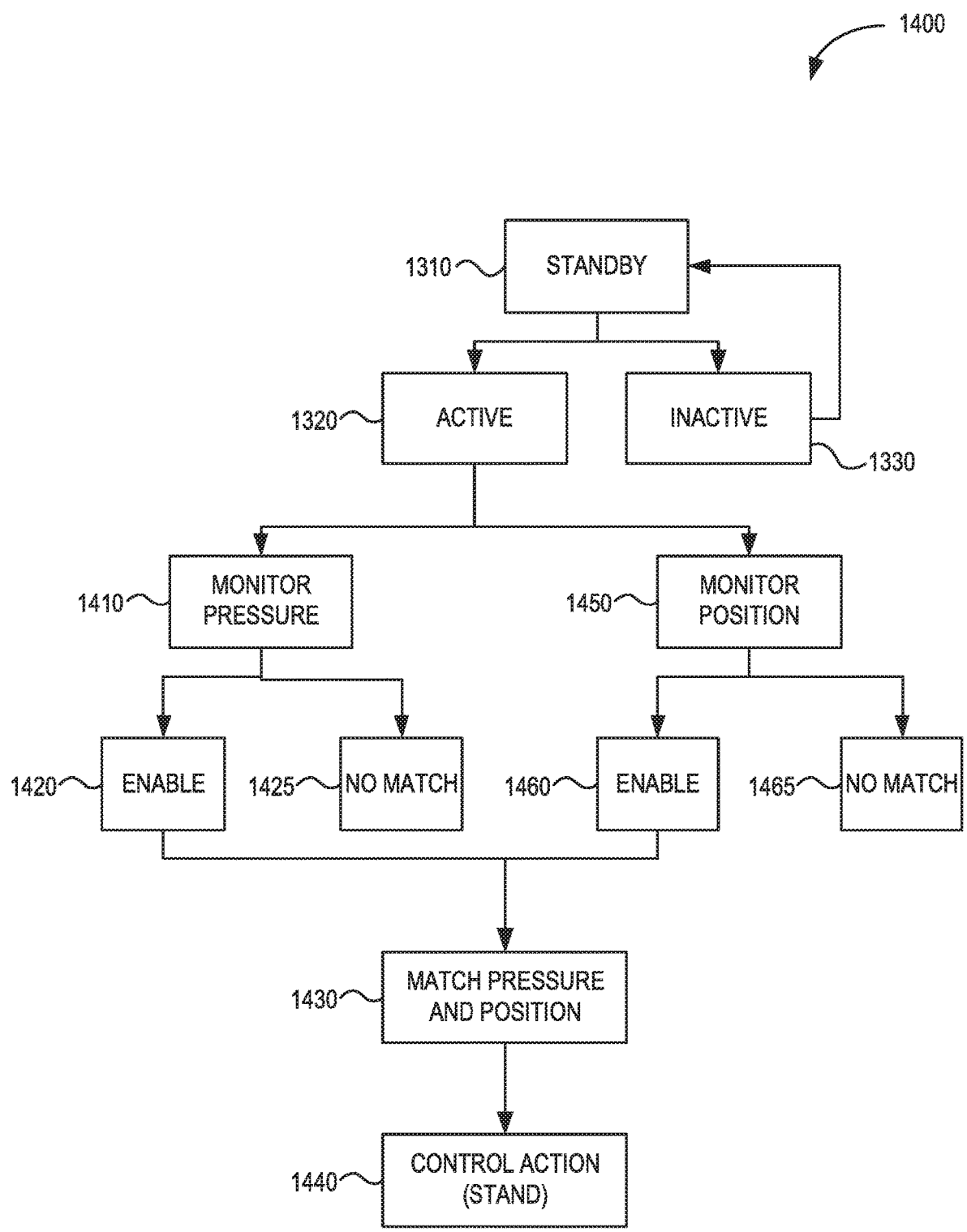
FIG. 34 is a flow diagram of a "sitting-to-standing" movement profile.

Referring now to FIG. 34, there is shown an example flow diagram 1400 for a "sitting-to-standing" movement profile. Flow 1400 may be initiated in response to activation (e.g., in flow 1300).

Input signals from pressure sensors and positional sensors (e.g., accelerometer) are monitored at 1410 and 1450, respectively. If the input signals do not match the expected values for the "sitting-to-standing" movement profile, monitoring of the pressure signals and positional signals may continue at 1425 and 1465, respectively. However, once the pressure signals and positional signals are within the expected values, enable signals are provided at 1420 and 1460, respectively. In response to the enable signals, processor 1010 determines that the "sitting-to-standing" movement profile has been enabled, and initiates one or more control actions at 1440 to cause the exoskeleton to carry out the standing motion, while monitoring for additional expected values.

Prior to initiating the control actions, the input signals may be considered primarily as binary enable/disable signals. That is, until the input signal values fall within the expected values, no control action is carried out.

Once the control action is initiated, the values of the input signals may be used to influence each control action, for example to vary the speed of a drive motor.

In general, the positional sensors may be continuously measuring data regarding the position of the exoskeleton (and user's body). The pressure sensors may be provided as pressure sensor matrices, one in each foot plate, which measure the weight distribution of the user or, viewed another way, the force being applied to the user's body by the foot plate.

In the "sitting-to-standing" movement profile, even balance between both legs is desired, thus the pressure sensor matrices can be monitored to ensure that pressure is generally equally distributed between both legs. The user may do this by aligning both the upper and lower body into a straight, centered posture.

At this point, the input profile identifies that an engage switch is active, pressure is evenly distributed, and that the positional sensors have values within expected values for the movement profile (i.e., enabling the movement profile).

Once the movement profile is enabled, the user may move the upper body into a start position, for example by leaning the torso forward over the legs. The positional sensors in the back support of the exoskeleton can detect this movement, which can indicate that the standing motion should commence. The processor continues monitoring input signals throughout the motion, and provides appropriate control signals to the motor drive modules to execute the motion in an orderly fashion.

Expected values for each sensor can be pre-determined and stored in a memory (e.g., database), by analyzing and recording data created by an able-bodied user.

The able-bodied user can be tasked with performing activities such as walking, running, standing from a chair, sitting into a chair, climbing stairs, descending stairs and turning. Each activity can be repeated multiple times, with multiple users, and the resulting combined data may be merged or averaged, for example, to create specific movement profiles corresponding to each activity.

Examples of data items stored for each movement profile include: x-axis data from gyroscopes or accelerometers, or both; y-axis data from gyroscopes or accelerometers, or both; z-axis data from gyroscopes or accelerometers, or both; pressure matrix values for left foot plate; and pressure matrix values for right foot plate.

Figure 35:
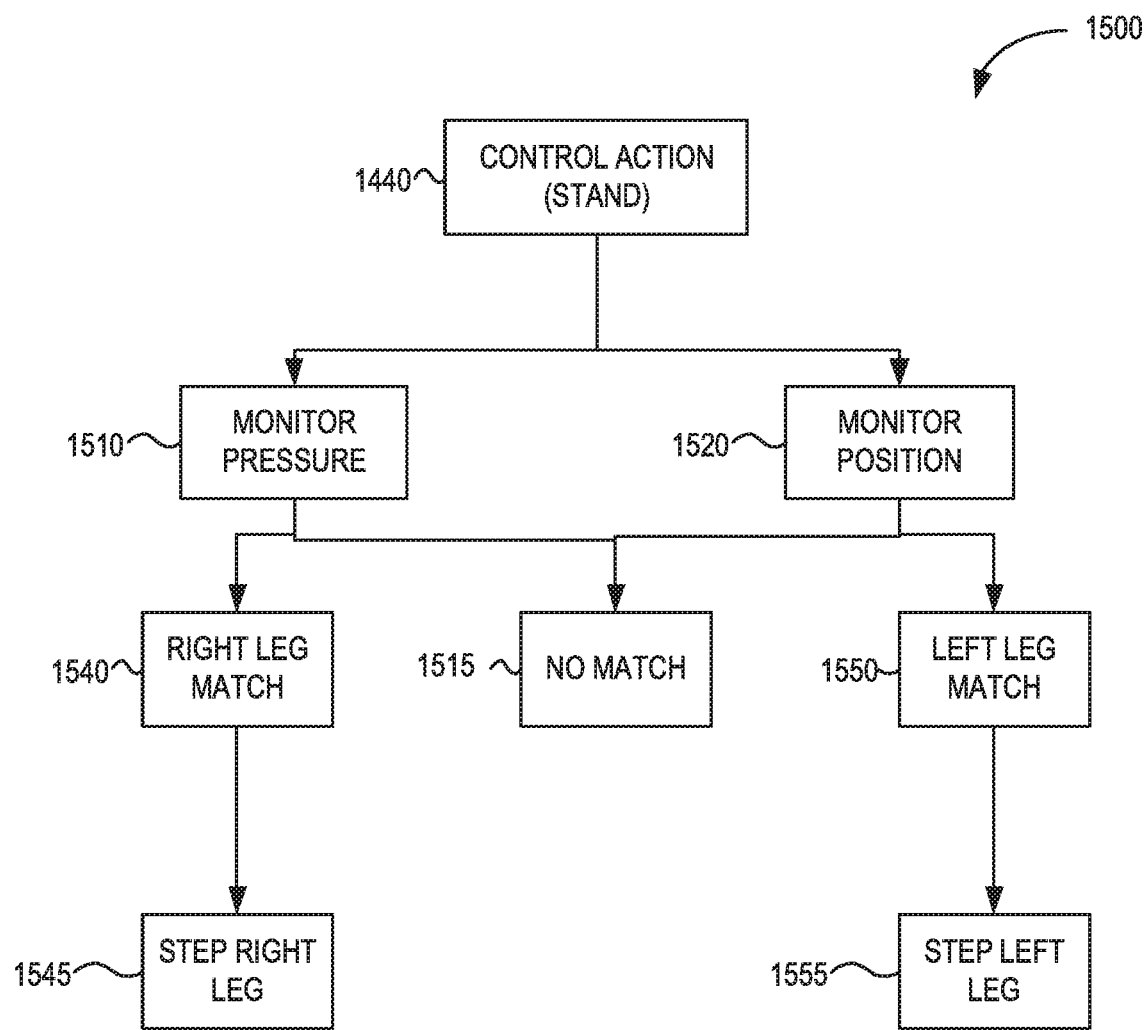
FIG. 35 is a flow diagram of a "standing-to-walking" movement profile.

Referring now to FIG. 35, there is shown a flow diagram 1500 for an example "standing-to-walking" movement profile.

Flow 1500 may begin following action 1440 of flow 1400.

At 1510, processor 1010 may determine if the input profile contains input signals from pressure sensors within the expected values for enabling a walking motion. For example, the expected values for enabling the walking motion may include an accelerometer signal from the back support of the exoskeleton, indicating that the user's back is upright. If the input signals are not within expected values, processor 1010 may continue monitoring at 1515. Alternatively, if the input signals are not within expected values for a walking motion, but are within expected values for a sitting motion, processor 1010 may continue to 1530, as described herein with reference to FIG. 37.

Similarly, at 1520, processor 1010 may determine if the input profile contains input signals from positional sensors within the expected values for enabling a walking motion. If the input signals are not within expected values, processor 1010 may continue monitoring at 1515. Alternatively, if the input signals are not within expected values for a walking motion, but are within expected values for a sitting motion, processor 1010 may continue to 1530, as described herein with reference to FIG. 37.

If, at 1540, processor 1010 determines that the input profile matches expected values for movement of the right leg, the control system initiates one or more control actions at 1545 to move the right leg ahead of the left leg.

If, at 1550, processor 1010 determines that the input profile matches expected values for movement of the left leg, the control system initiates one or more control actions at 1555 to move the left leg ahead of the right leg.

In operation, the user can be trained to control the walking action by shifting body weight onto one leg or the other, with the aid of supports such as canes or crutches. Pressure sensor signals can be used to confirm that the user's weight has shifted, indicating that the leg should be moved.

For example, if the user wants to move the right leg, the user can shift his or her upper body to the left in order to cause input signals from the positional and pressure sensors to provide an input profile that matches a "right leg forward" movement profile, and vice versa.

Figure 36:
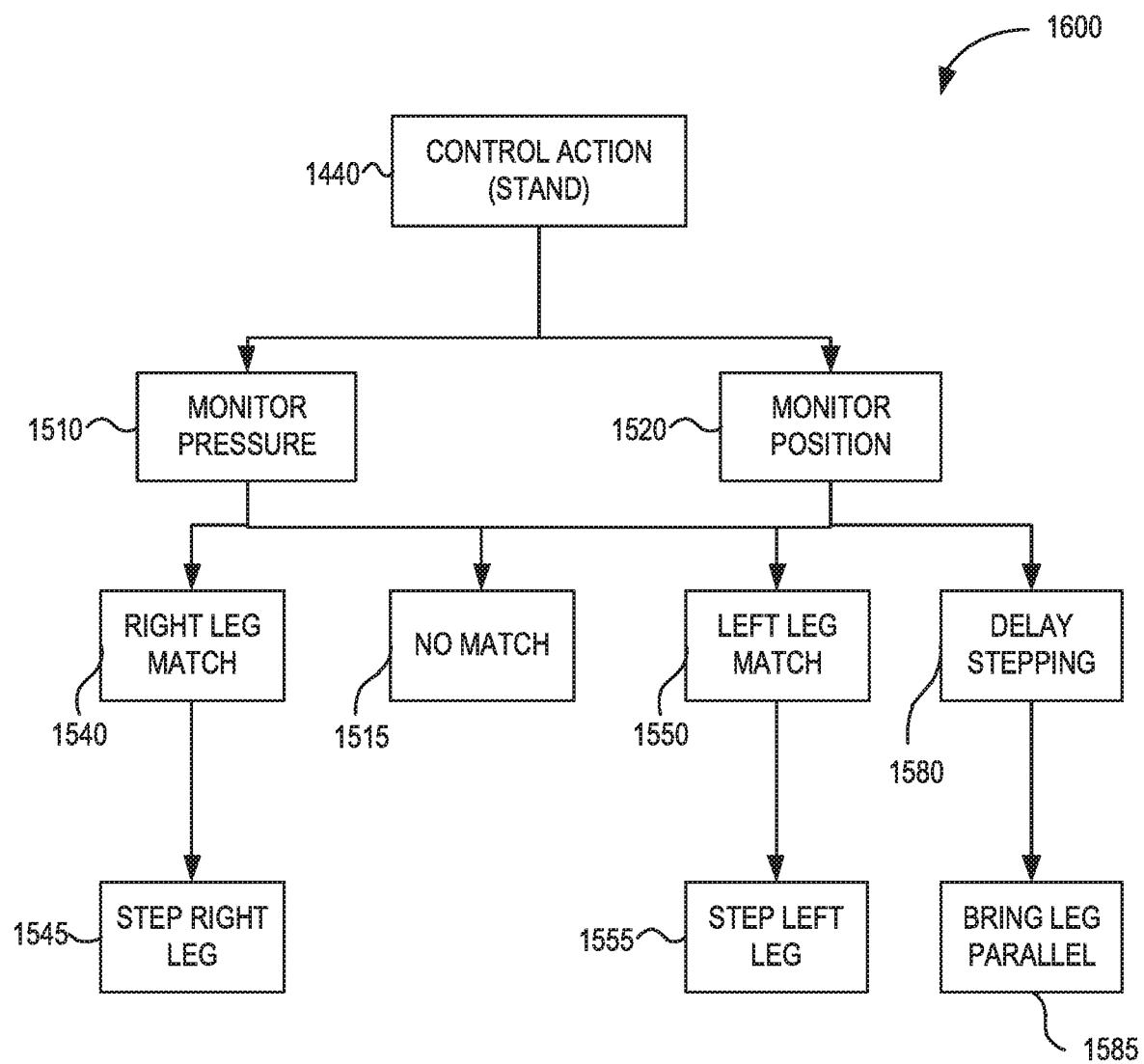
FIG. 36 is a flow diagram of a "walking-to-stopping" movement profile.

Referring now to FIG. 36, there is shown a flow diagram 1600 for an example "walking-to-stopping" movement profile.

Flow 1600 is generally analogous to flow 1500. However, to cause a stop in the walking motion, the user can delay input for a predetermined period following a stepping motion. In response to the delay, processor 1010 can automatically cause the lagging leg to be brought forward parallel with the leading leg, resulting in a stable standing position.

Thus, if, after 1540 or 1550, the user does not provide a further input to move either leg, this delay is identified at 1580, and one or more control action is initiated to bring the lagging leg forward parallel with the leading leg at 1585.

Figure 37:
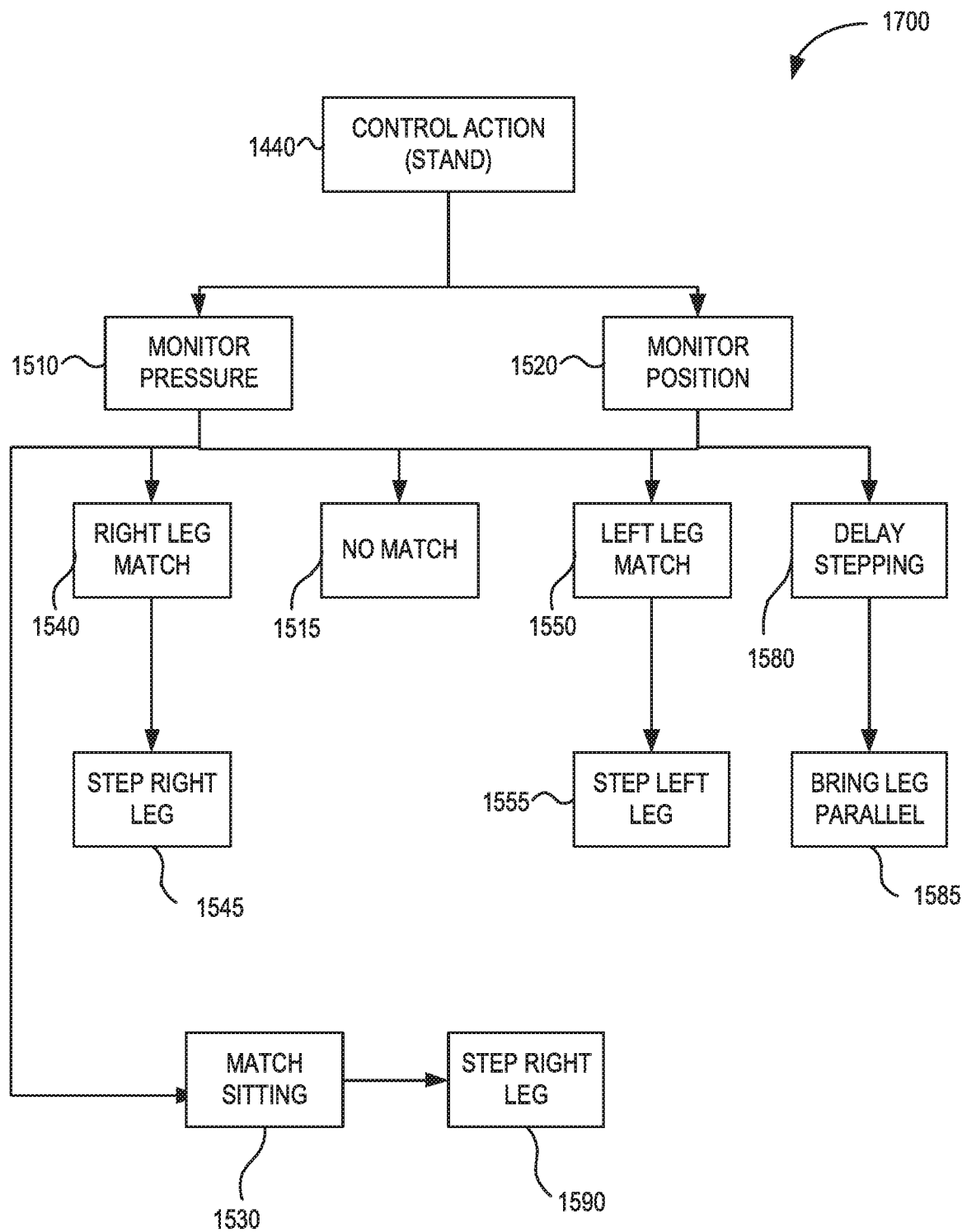
FIG. 37 is a flow diagram of a "standing-to-sitting" movement profile.

Referring now to FIG. 37, there is shown a flow diagram 1700 for an example "standing-to-sitting" movement profile.

Flow 1700 is generally analogous to flow 1500 or 1600. However, to cause the sitting motion, the user may position the body such that the sensors provide an input profile that triggers the sitting motion. For example, in the standing, upright position, the upper body of the user should be also in an upright position and the exoskeleton should have both legs parallel to each other, with weight balanced between both legs. The user can initiate the process by leaning the upper torso backwards and using crutches to balance weight on both legs. Positional sensors on the back support of the exoskeleton can detect this movement and provide input signals that result in an input profile that matches the "standing-to-sitting" movement profile, processor 1010 initiates one or more control actions to activate drive motors to carry out the sitting motion.

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. The scope of the claims should not be limited by the preferred embodiments and examples, but should be given the broadest interpretation consistent with the description as a whole.

We claim:

1. A method of controlling an exoskeleton apparatus for a paraplegic user, the exoskeleton apparatus pre-configured by a user with unimpaired leg function, the exoskeleton apparatus with at least one actuator for manipulating a limb of the exoskeleton, the method comprising:
providing a plurality of sensors coupled to the exoskeleton, each of the sensors configured to detect a physiological characteristic when the exoskeleton apparatus is used by the paraplegic user;
receiving input signals from each of the sensors coupled to the exoskeleton and generating an input profile from sensor values produced only by the sensors coupled to the exoskeleton;
selecting a profile with expected values that correspond to the sensor values from a plurality of movement profiles, each of the movement profiles corresponding to a control action, wherein the expected values are predetermined, and wherein each of the movement profiles is pre-configured based on able-bodied use data generated by the user with unimpaired leg function for the exoskeleton apparatus; and
implementing the control action in response to selecting the profile.

2. The method of claim 1, further comprising re-generating the input profile periodically.

3. The method of claim 2, wherein the selecting the profile is repeated each time the input profile is re-generated.

4. The method of claim 1, wherein at least one of the movement profiles is associated with an active mode of the exoskeleton, and wherein implementing the control action comprises providing a control signal to the at least one actuator when the selected profile is associated with the active mode.

5. The method of claim 4, wherein at least one of the movement profiles is associated with an inactive mode of the exoskeleton, and wherein implementing the control action comprises providing no control signal to the at least one actuator when the selected profile is associated with the inactive mode.

6. The method of claim 1, wherein the physiological characteristic is a positional characteristic for at least one of the sensors.

7. The method of claim 6, wherein the plurality of sensors comprises at least one accelerometer, and wherein the positional characteristic comprises an acceleration.

8. The method of claim 6, wherein the plurality of sensors comprises at least one gyroscope, and wherein the positional characteristic comprises at least one characteristic selected from the group consisting of roll, yaw and pitch.

9. The method of claim 1, wherein the plurality of sensors comprises at least one force sensor, and wherein the physiological characteristic is a force.

10. The method of claim 1, wherein the input profile comprises an indication of a previous movement profile.

11. The method of claim 1, wherein the input profile comprises an interface input indication.

12. The method of claim 1, wherein each of the movement profiles is predefined based on possible movements of the exoskeleton.

13. The method of claim 1, wherein each of the movement profiles is predetermined based on at least one patient characteristic.

14. The method of claim 1, wherein the plurality of movement profiles are stored in a memory of the apparatus.

15. The method of claim 1, wherein the expected values are predetermined by recording the movement of the exoskeleton apparatus in a prior session.

16. The method of claim 1, wherein the able-bodied use data is generated in at least one prior recording based on sensor values produced by the sensors.

17. The method of claim 16, wherein the at least one prior recording comprises a plurality of prior recordings, and wherein the able-bodied use data is based on the plurality of prior recordings.

18. The method of claim 1, wherein the able-bodied use data corresponds to at least one activity selected from the list consisting of walking, running, standing from a sitting position, sitting from a standing position, climbing stairs, descending stairs, and turning.

19. An apparatus for controlling an exoskeleton for a paraplegic user, the apparatus pre-configured by a user with unimpaired leg function, the apparatus with at least one actuator for manipulating a limb of the exoskeleton, the apparatus comprising:
a plurality of sensors coupled to the exoskeleton, each of the sensors configured to detect a physiological characteristic and produce sensor values when the exoskeleton apparatus is used by the paraplegic user;
a memory configured to store a plurality of movement profiles, wherein each of the plurality of movement profiles has associated therewith one or more expected values, wherein the expected values are sensor values that are expected to be received from the plurality of sensors, and wherein each of the movement profiles is pre-configured based on able-bodied use data generated by the user with unimpaired leg function for the exoskeleton apparatus;
a controller configured to receive input signals from each of the sensors coupled to the exoskeleton wherein the input signals are based only on the sensor values produced by sensors coupled to the exoskeleton; and
a processor configured to:
generate an input profile based on the input signals;
select a profile which has associated expected values that correspond to the sensor values of the input profile from the plurality of movement profiles, each of the movement profiles corresponding to a control action; and
implement the control action in response to selecting the profile.

20. A non-transitory computer readable medium storing program instructions which, when executed by a processor, cause the processor to carry out a method of controlling an exoskeleton apparatus for a paraplegic user, the exoskeleton apparatus pre-configured by a user with unimpaired leg function, the exoskeleton apparatus with at least one actuator for manipulating a limb of the exoskeleton, wherein a plurality of sensors are coupled to the exoskeleton, each of the sensors configured to detect a physiological characteristic when the exoskeleton apparatus is used by the paraplegic user, the method comprising:
receiving input signals from each of the sensors coupled to the exoskeleton and generating an input profile from sensor values produced only by the sensors coupled to the exoskeleton;

selecting a profile with expected values that correspond to the sensor values from a plurality of stored movement profiles, each of the movement profiles corresponding to a control action, wherein the expected values are stored on the computer readable medium, and wherein each of the movement profiles is pre-configured based on able-bodied use data generated by the user with unimpaired leg function for the exoskeleton apparatus; and implementing the control action in response to selecting the profile.

\* \* \* \* \*